US009594835B2

(12) United States Patent
Murdock et al.

(10) Patent No.: US 9,594,835 B2
(45) Date of Patent: Mar. 14, 2017

(54) LIGHTNING SEARCH AGGREGATE

(75) Inventors: Vanessa Murdock, Barcelona (ES); Lluis Garcia, Sant Cugat del Vallès (ES); Barbara Poblete, Barcelona (ES); Vassilis Plachouras, Barcelona (ES)

(73) Assignee: Yahoo! Inc., Sunnyvale, CA (US)

( * ) Notice: Subject to any disclaimer, the term of this patent is extended or adjusted under 35 U.S.C. 154(b) by 920 days.

(21) Appl. No.: 12/323,354

(22) Filed: Nov. 25, 2008

(65) Prior Publication Data
US 2010/0131495 A1    May 27, 2010

(51) Int. Cl.
*G06F 17/30* (2006.01)
(52) U.S. Cl.
CPC .. *G06F 17/30864* (2013.01); *G06F 17/30902* (2013.01)
(58) Field of Classification Search
CPC ......... G06F 17/30554; G06F 17/30867; G06F 17/3097
See application file for complete search history.

(56) References Cited

U.S. PATENT DOCUMENTS

| | | | |
|---|---|---|---|
| 6,631,496 B1 | 10/2003 | Li et al. | |
| 8,290,944 B2 | 10/2012 | Murdock et al. | |
| 8,868,551 B2 | 10/2014 | Murdock et al. | |
| 2002/0069194 A1* | 6/2002 | Robbins | 707/3 |
| 2002/0103876 A1* | 8/2002 | Chatani et al. | 709/217 |
| 2004/0199496 A1* | 10/2004 | Liu et al. | 707/3 |
| 2005/0149504 A1* | 7/2005 | Ratnaparkhi | 707/3 |
| 2005/0267871 A1* | 12/2005 | Marchisio | G06F 17/30672 |
| 2006/0004892 A1* | 1/2006 | Lunt et al. | 707/204 |
| 2006/0074870 A1* | 4/2006 | Brill et al. | 707/3 |
| 2006/0190439 A1* | 8/2006 | Chowdhury et al. | 707/3 |
| 2006/0195442 A1* | 8/2006 | Cone et al. | 707/5 |
| 2006/0206460 A1 | 9/2006 | Gadkari | |
| 2007/0067305 A1* | 3/2007 | Ives | 707/10 |
| 2007/0078822 A1* | 4/2007 | Cucerzan et al. | 707/3 |
| 2007/0239713 A1 | 10/2007 | Leblang et al. | |
| 2008/0065617 A1* | 3/2008 | Burke et al. | 707/5 |
| 2008/0104510 A1* | 5/2008 | Eldering | 715/700 |
| 2008/0168065 A1 | 7/2008 | Kanevsky et al. | |
| 2008/0235187 A1* | 9/2008 | Gade et al. | 707/3 |
| 2009/0182727 A1* | 7/2009 | Majko | 707/5 |
| 2010/0131493 A1 | 5/2010 | Murdock et al. | |
| 2013/0013628 A1 | 1/2013 | Murdock et al. | |

OTHER PUBLICATIONS

Yahoo! Make Y! your home page, http://www.yahoo.com/ printed Nov. 24, 2008, 2 pgs.

(Continued)

*Primary Examiner* — Syed Hasan
(74) *Attorney, Agent, or Firm* — Weaver Austin Villeneuve & Sampson LLP

(57) ABSTRACT

Disclosed are methods and apparatus for executing a search query. In accordance with one embodiment, a search query is obtained. The search query is classified into one or more of a plurality of categories. The search query is executed for each of the one or more of the plurality of categories. Search results corresponding to the search query are obtained for each of the one or more of the plurality of categories. The search results are then provided for each of the one or more of the plurality of categories.

29 Claims, 30 Drawing Sheets

(56) References Cited

OTHER PUBLICATIONS

Yahoo! Search Results, angelina jolie, http://search.yahoo.com/search?p=angelina+jolie&fr=yfp-t-201&toggle=1&cop=mss&ei . . . printed Nov. 24, 2008, 2 pgs.
Google Advanced Search, http://www.google.com/advanced_search?hl=en printed Nov. 24, 2008, 1 pg.
Internet bookmark—Wikipedia, the free encyclopedia, http://en.wikipedia.org/wiki/Bookmark_manager printed Nov. 24, 2008, 3 pgs.
Murdock et al., "Lightning Search Bookmark", Yahoo! Inc. Application filed on Nov. 25, 2008, 47 pgs.
U.S. Appl. No. 12/323,297, Office Action mailed Jun. 27, 2011.
U.S. Appl. No. 12/323,297, Office Action mailed Dec. 8, 2011.
U.S. Appl. No. 12/323,297, Notice of Allowance mailed Jul. 17, 2012.
U.S. Appl. No. 13/619,443, Office Action mailed Jan. 2, 2014.
U.S. Appl. No. 13/619,443, Notice of Allowance mailed Jun. 12, 2014.

\* cited by examiner

LIGHTNING SEARCH AGGREGATE

BACKGROUND OF THE INVENTION

The present invention relates generally to computer implemented searches.

Every day, millions of users search for information on the web via search engines. Through their interaction with search engines, not only are they able to locate the information they are looking for, but they also provide implicit feedback on the results shown in response to their queries by clicking or not clicking onto the search results.

Nowadays search engines can record query logs that keep various types of information about which documents (e.g., web pages or web sites) users click for which query. Such information can be seen as "soft" relevance feedback for the documents that are clicked as a result of specific queries. This "soft" relevance feedback may be used to generate a score associated with these documents that indicates the relevance of the documents to a particular query. This score may then be used by search engines to provide the most relevant documents in response to queries.

While documents that are provided in response to queries may be relevant to those queries, search results are not generally provided in an organized manner. As a result, these search results are often cumbersome to view. Accordingly, sorting through these search results can yield an unsatisfying and frustrating user experience.

In view of the above, it would be beneficial if improved methods of searching could be implemented.

SUMMARY OF THE INVENTION

Methods and apparatus for automatically executing a search query are disclosed. In accordance with one embodiment, a search query is obtained. The search query is classified into one or more of a plurality of categories. The search query is executed for each of the one or more of the plurality of categories. Search results corresponding to the search query are obtained for each of the one or more of the plurality of categories. The search results are then provided for each of the one or more of the plurality of categories.

In accordance with another embodiment, a selection of one of a set of bookmarks is received, wherein each of the set of bookmarks identifies a search query that has previously been submitted. Search results are retrieved from memory, the search results corresponding to the selected bookmark. The search results that have been retrieved are then provided, wherein the search results include a link to each of one or more documents, wherein each of the documents is associated with a corresponding one of a plurality of categories.

In another embodiment, the invention pertains to a device comprising a processor, memory, and a display. The processor and memory are configured to perform one or more of the above described method operations. In another embodiment, the invention pertains to a computer readable storage medium having computer program instructions stored thereon that are arranged to perform one or more of the above described method operations.

These and other features and advantages of the present invention will be presented in more detail in the following specification of the invention and the accompanying figures which illustrate by way of example the principles of the invention.

DETAILED DESCRIPTION OF THE SPECIFIC EMBODIMENTS

Reference will now be made in detail to specific embodiments of the invention. Examples of these embodiments are illustrated in the accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In the following description, a document may be defined as a Uniform Resource Locator (URL) that identifies a location at which the document can be located. The document may be located on a particular web site, as well as a specific web page on the web site. For instance, a first URL may identify a location of a web page at which a document is located, while a second URL may identify a location of a web site at which the document can be located.

In recent years, the Internet has been a main source of information for millions of users. These users rely on the Internet to search for information of interest to them. One conventional way for users to search for information is to initiate a search query through a search service's web page. Typically, a user can enter a query including one or more search term(s) into an input box on the search web page and then initiate a search based on such entered search term(s). In response to the query, a web search engine generally returns an ordered list of search result documents.

Figure 1:
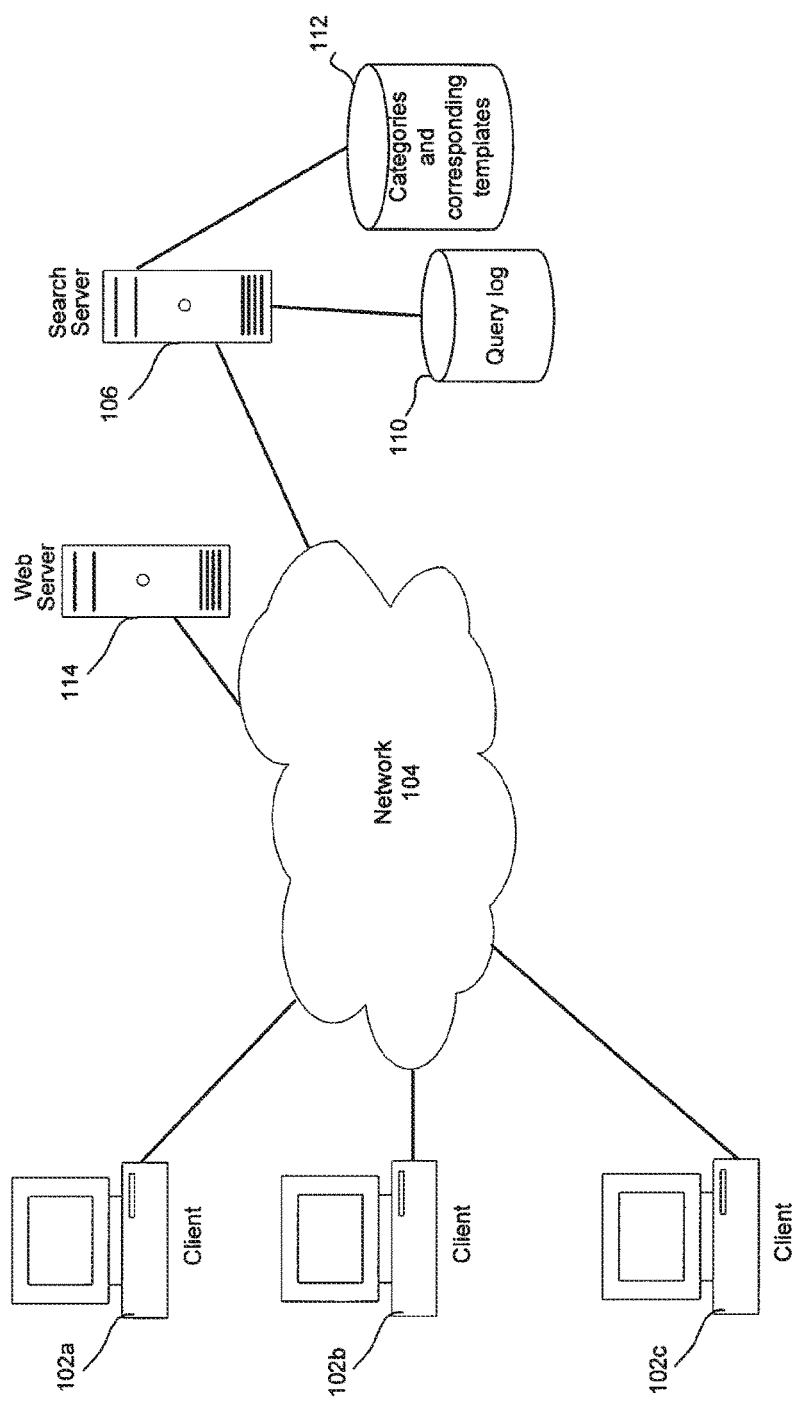
FIG. 1 is a block diagram illustrating an example system in which various embodiments may be implemented.

FIG. 1 illustrates an example network segment in which various embodiments of the invention may be implemented. As shown, a plurality of clients 102a, 102b, 102c may access a search application, for example, on search server 106 via network 104 and/or access a web service, for example, on web server 114. The network may take any suitable form, such as a wide area network or Internet and/or one or more local area networks (LAN's). The network 104 may include any suitable number and type of devices, e.g., routers and switches, for forwarding search or web object requests from each client to the search or web application and search or web results back to the requesting clients.

The invention may also be practiced in a wide variety of network environments (represented by network 104) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

A search application generally allows a user (human or automated entity) to search for information that is accessible via network 104 and related to a search query including one or more search terms. The search terms may be entered by a user in any manner. For example, the search application may present a web page having any input feature to the client (e.g., on the client's device) so the client can enter a query including one or more search term(s). In a specific implementation, the search application presents an input box into which a user may type a query including any number of search terms. Embodiments of the present invention may be employed with respect to any search application. Example search applications include Yahoo! Search, Google, Altavista, Ask Jeeves, etc. The search application may be implemented on any number of servers although only a single search server 106 is illustrated for clarity.

The search server 106 (or servers) may have access to one or more query logs 110 into which search information is retained. For example, the query logs 110 may be retained in one or more memories that are coupled to the search server 106. Each time a user performs a search on one or more search terms, information regarding such search may be retained in the query logs 110. For instance, the user's search request may contain any number of parameters, such as user or browser identity and the search terms, which may be retained in the query logs 110. Additional information related to the search, such as a timestamp, may also be retained in the query logs 110 along with the search request parameters. When results are presented to the user based on the entered search terms, parameters from such search results may also be retained in the query logs 110. For example, the specific search results, such as the web sites, the order in which the search results are presented, whether each search result is a sponsored or algorithmic search result, the owner (e.g., web site) of each search result, whether each search result is selected (i.e., clicked on) by the user (if any), and/or a timestamp may also be retained in the query logs 110.

The implicit feedback provided by users when they click (or don't click) on various search results is typically recorded by a search engine in the form of a query log that includes a sequence of search actions, one per user query. Each search action may include one or more terms composing a query, one or more documents returned by the search engine, one or more documents that have been clicked, the rank of the document(s) that have been clicked, the rank of the documents in the list of search results, the date and/or time of the search action/click, an anonymous identifier for each search session, and/or a user identifier associated with the query, etc. It is important to note that the information in query logs is not typically provided to a client performing searches. In accordance with various embodiments, this information, or a portion thereof, may be processed and/or provided to the user in order to facilitate the search process and improve the user search experience, as will be described in further detail below.

In accordance with various embodiments, a Lightning Search feature may be implemented. The Lightning Search feature may provide two different related features in association with a particular client, user, or web browser. First, search queries that are submitted may be automatically stored as bookmarks without initiation by a user. Second, documents that are clicked in association with a particular search query may be identified in association with a corresponding bookmark. This may be accomplished by storing a hypertext link to each clicked document in association with the corresponding bookmark. The bookmarks and user clicks may be retained over multiple search sessions (e.g., until the Lightning Search feature is reset).

In accordance with further embodiments, an Aggregate Search feature enables a search query to be classified into one or more categories and executed for each of the categories. Search results may then be provided (e.g., displayed) for those categories, as will be described in further detail below. Search results for each category may be provided in a particular manner that is suitable for that category. This may be accomplished through the use of a template, which may be stored statically in memory or generated dynamically, as will be described in further detail below.

While information related to searches such as that described above may be stored in one or more query logs 110, information specific to the Lightning Search feature and/or the Lightning Search aggregate feature may also be stored separately as shown at 112 in one or more memories that are coupled to the search server 106. Such information may also be stored in a memory of one of the clients 102a, 102b, 102c that performed these searches (e.g., as user data of a web browser). For instance, software and/or data related to bookmarks, user clicks, categories, categorization of search queries, templates, and/or generation of templates for use in displaying search results based upon corresponding categories may be stored. Thus, software for performing the disclosed embodiments and data used by and generated via the disclosed embodiments may be stored in a memory associated with the search server 106 and/or a corresponding one of the clients 102a, 102b, 102c.

Bookmarks and/or user clicks may later be automatically retrieved from the memory(s) associated with the search server 106 and/or client 102a and provided upon initiation of a search session or during a search session via that client (e.g., in response to user input), as will be described in further detail below. For example, bookmarks may be automatically generated and provided via a user interface when the client, web browser, or user identified by a specific user identifier returns to a web page via which the search engine may be accessed.

Moreover, aggregate search results corresponding to categories may also be stored and later retrieved from the memory(s) associated with the search server 106 and/or client 102a and provided upon initiation of a search session or during a search session via that client. For example, aggregate search results may be automatically generated and provided via a user interface when the client, web browser, or user identified by a specific user identifier returns to a web page via which the search engine may be accessed or in response to user input.

Embodiments disclosed herein may be implemented via the search server 106 and/or the clients 102a, 102b, 102c. For example, various features may be implemented via a web browser on the clients 102a, 102b, 102c. The disclosed embodiments may be implemented via software and/or hardware.

Figure 2:
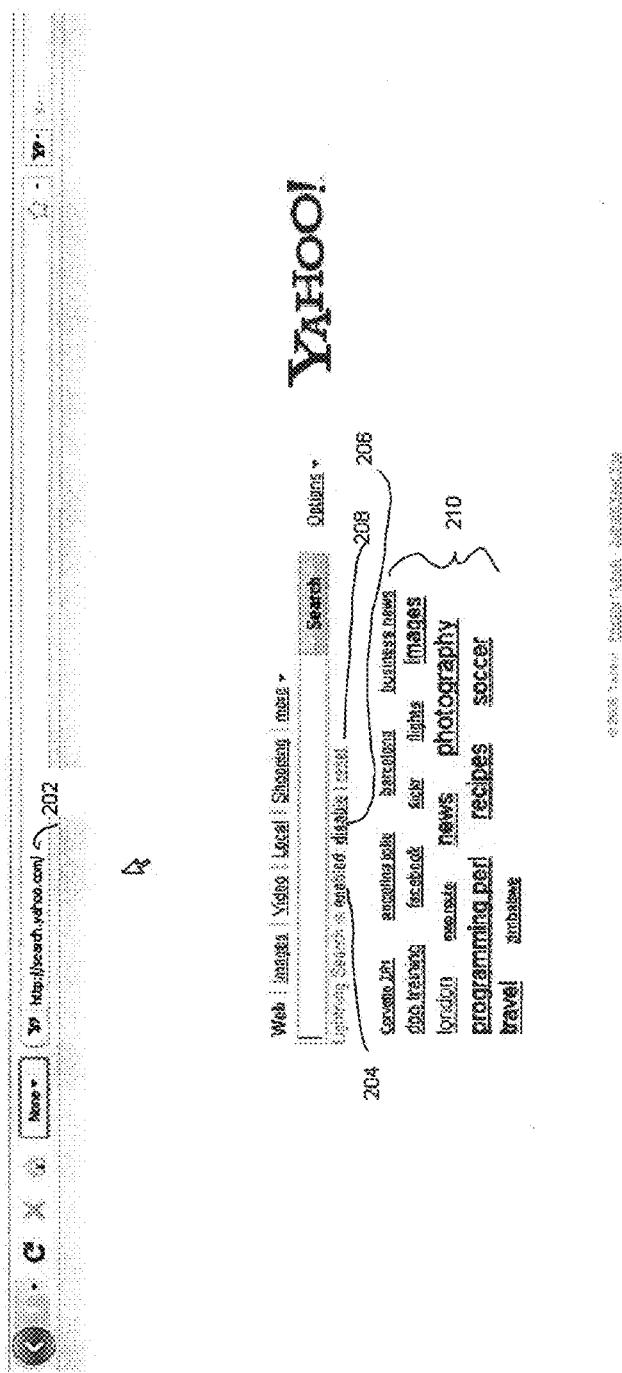
FIG. 2 is a screen shot illustrating an example graphical user interface via which bookmarks may be implemented.

FIG. 2 is a screen shot illustrating an example graphical user interface via which bookmarks may be implemented. As shown in this example, a search portal 202 via which a user may submit search queries may be a web site such as http://search.yahoo.com/. The Lightning Search feature may be enabled 204 or disabled 206. The Lightning Search feature may also be reset 208. Resetting the Lightning Search feature may result in the deletion of any bookmarks and any associated user clicks that have been stored in association with a particular browser, client, user, or user account.

As shown in this example, a set of one or more bookmarks 210 may be automatically generated (e.g., provided or displayed) when a client, web browser, or user associated with the set of bookmarks returns to the search portal 202. In this example, the set of bookmarks is generated underneath the search text box 212. Each of the bookmarks represents a search query that has previously been submitted via the portal 202. Moreover, each of these bookmarks may include a hypertext link that enables an associated set of documents to be retrieved. In this example, the set of bookmarks 210 includes eighteen bookmarks, which include "Corvette ZR1," "angelina jolie," "barcelona," "business news," "dog training," "facebook," "flickr," "flights," "images," "london," "map route," "news," "photography," "programming perl," "recipes," "soccer," "travel," and "zimbabwe."

Each of the bookmarks in the set of bookmarks 210 may be associated with display characteristics. Thus, in order to automatically generate one of the bookmarks in the set of bookmarks 210, the display characteristics of the bookmark may be obtained. The bookmark may then be displayed in accordance with the display characteristics.

Information that is stored in association with a particular bookmark may be used to establish or modify the display characteristics of the bookmark. For instance, information such as the frequency with which a particular search query is executed (e.g., via selection of the bookmark) may be used to establish or modify the display characteristics of the corresponding bookmark. Thus, a bookmark associated with a more frequently executed search may be displayed more prominently, while a bookmark associated with a less frequently executed search may be displayed less prominently. The display characteristics of a bookmark may include properties such as the size of the font used to display the bookmark, color of the bookmark, whether the bookmark is bolded and/or underlined, etc. Accordingly, a hypertext link associated with a bookmark may be displayed in accordance with a frequency with which the bookmark is clicked (e.g., by the user, browser, or client device). This click frequency may be determined with respect to other bookmarks. In other words, it may be determined which bookmarks are clicked most frequently in order to emphasize the most frequently selected bookmarks.

A user may explicitly or implicitly submit a request to view information associated with a particular bookmark. This information may indicate those documents that have been clicked in association with a previously submitted search query identified by the bookmark, as well as other information associated with these documents. For example, the information may indicate a frequency with which each of the documents has been viewed (e.g., by the corresponding user, web browser, or client).

In accordance with one embodiment, when a cursor is placed over one of the set of bookmarks, a set of one or more user clicks associated with the bookmark may be automatically provided (e.g., displayed). Specifically, each of the user clicks may include a hypertext link to a document that has been previously clicked in association with the search query (e.g., identified by the bookmark) that has previously been executed.

Figure 3:
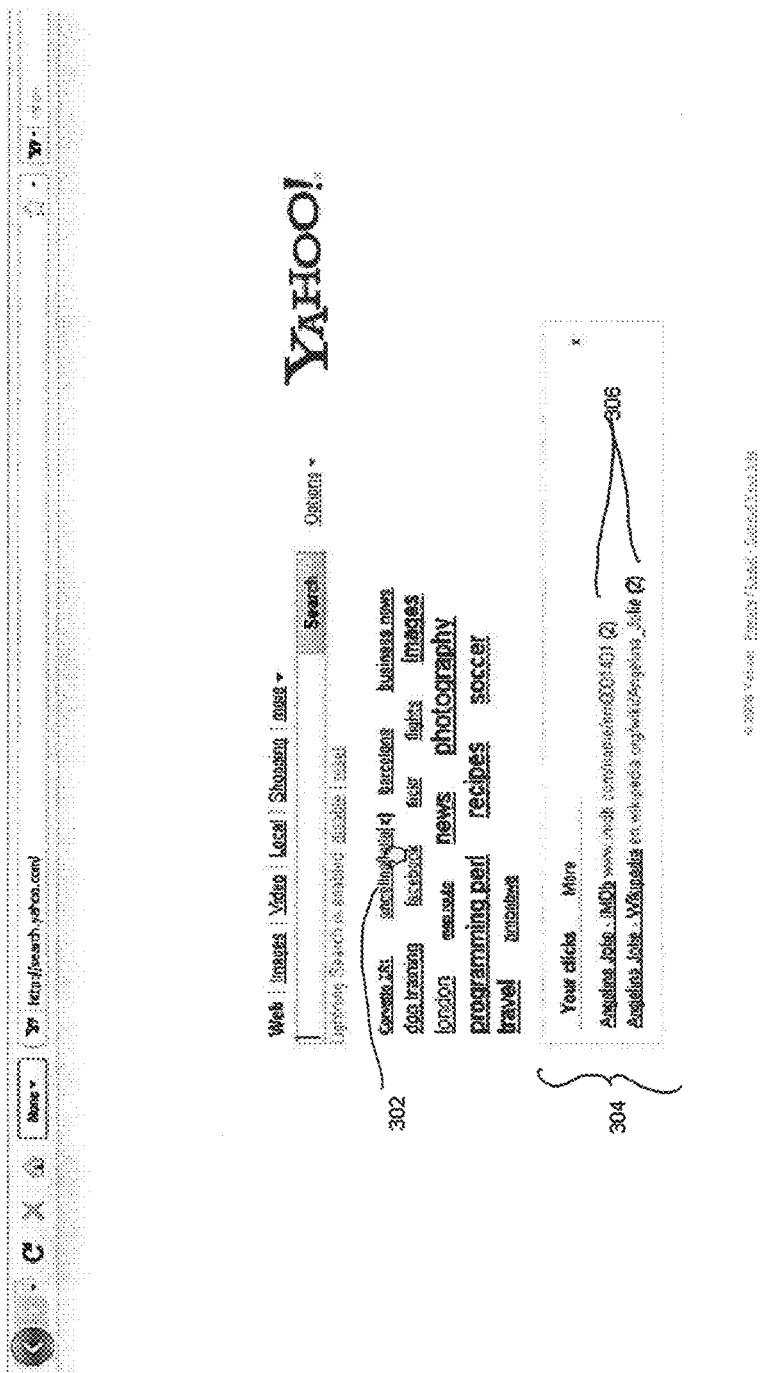
FIG. 3 is a screen shot illustrating an example graphical user interface via which prior search results that have been clicked may be accessed in association with one of the bookmarks shown in FIG. 2.

FIG. 3 is a screen shot illustrating an example graphical user interface via which prior search results that have been clicked may be accessed in association with one of the bookmarks shown in FIG. 2. As shown in this example, bookmark "angelina jolie" 302 indicates that the user previously submitted the "angelina jolie" search query. When a cursor is placed over the bookmark, "angelina jolie" 302, a set of user clicks associated with the bookmark is provided as shown at 304. In this example, the set of user clicks includes two different documents that are identified by corresponding hypertext links.

For each of the documents that were previously clicked, information associated with the document may be obtained and provided. For instance, this information may indicate a frequency with which the document has been selected (e.g., by the client, user, or web browser). As shown in this example at 306, the user has previously selected each of the documents identified under the heading "Your clicks" twice.

Figure 4:
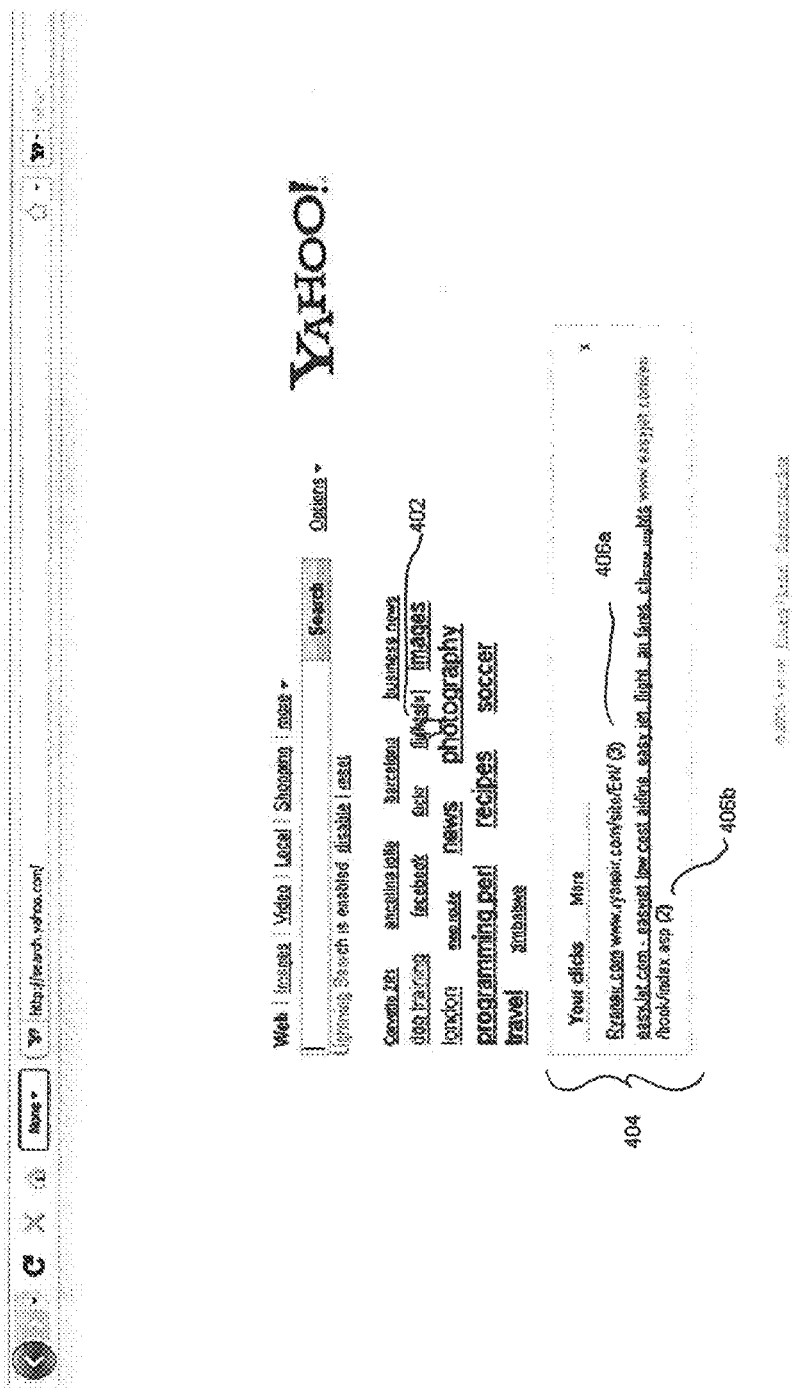
FIG. 4 is a screen shot illustrating example prior search results that have been clicked in association with another one of the bookmarks shown in FIG. 2.

FIG. 4 is a screen shot illustrating example prior search results that have been clicked in association with another one of the bookmarks shown in FIG. 2. As shown in this example, bookmark "flights" 402 indicates that the user previously submitted the "flights" query. When the cursor is placed over the bookmark, "flights" 402, a set of user clicks associated with the bookmark is provided as shown at 404. In this example, the set of user clicks includes two different documents that are identified by corresponding hypertext links.

As shown in this example, for each of the documents that was previously clicked, information indicating a frequency with which the document has been selected (e.g., by the client, user, or web browser) is provided. As shown in this example at 406a and 406b, the first document identified under the heading "Your clicks" has previously been selected by the user three times, while the second document identified under the heading "Your clicks" has previously been selected by the user twice.

Figure 5A:
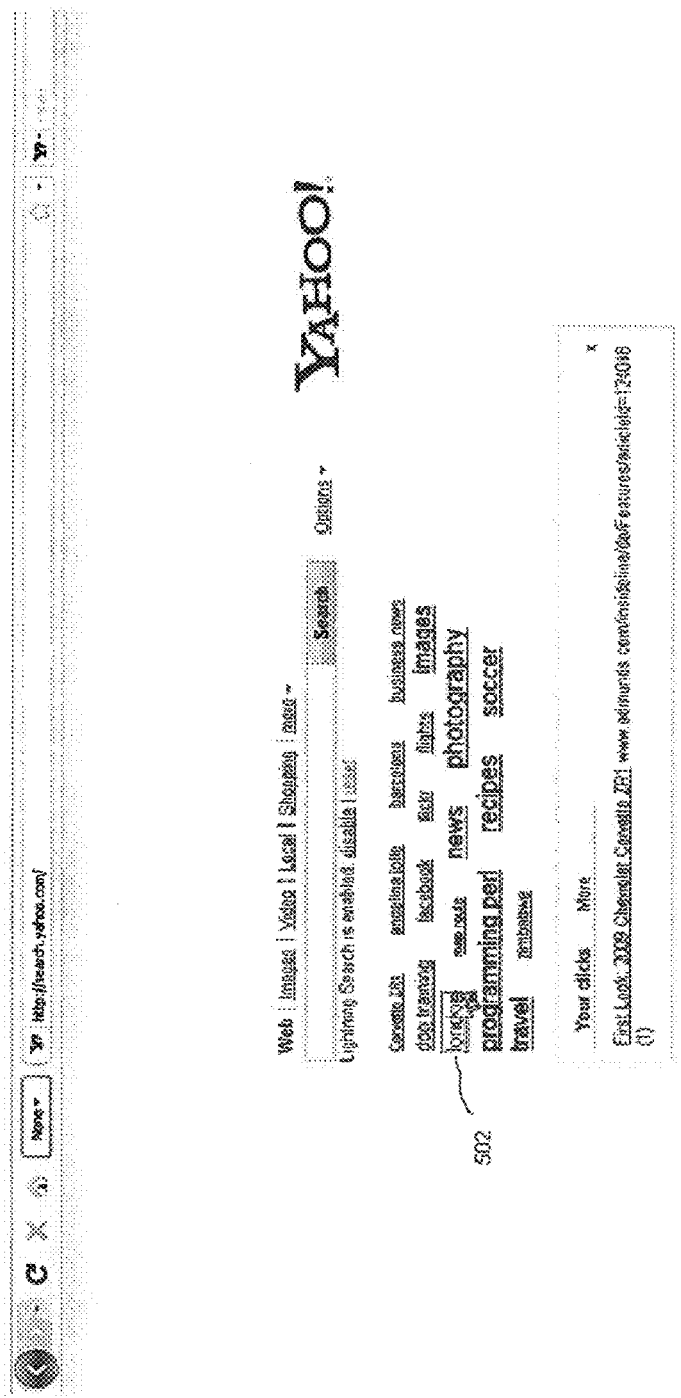
FIG. 5A is a screen shot illustrating an example graphical user interface via which a search associated with one of the bookmarks shown in FIG. 2 may be performed.

FIG. 5A is a screen shot illustrating an example graphical user interface via which a search associated with one of the bookmarks shown in FIG. 2 may be performed. Specifically, in this example, the user selects bookmark "london" 502 by clicking on the bookmark 502. Upon clicking on the bookmark 502, a search with the search term "london" represented by the bookmark 502, london, is performed. Accordingly, when one of the automatically generated bookmarks is selected, the search query represented by the selected bookmark is executed. The search engine may then obtain the search results corresponding to the search query and provide the search results corresponding to the search query.

Figure 5B:
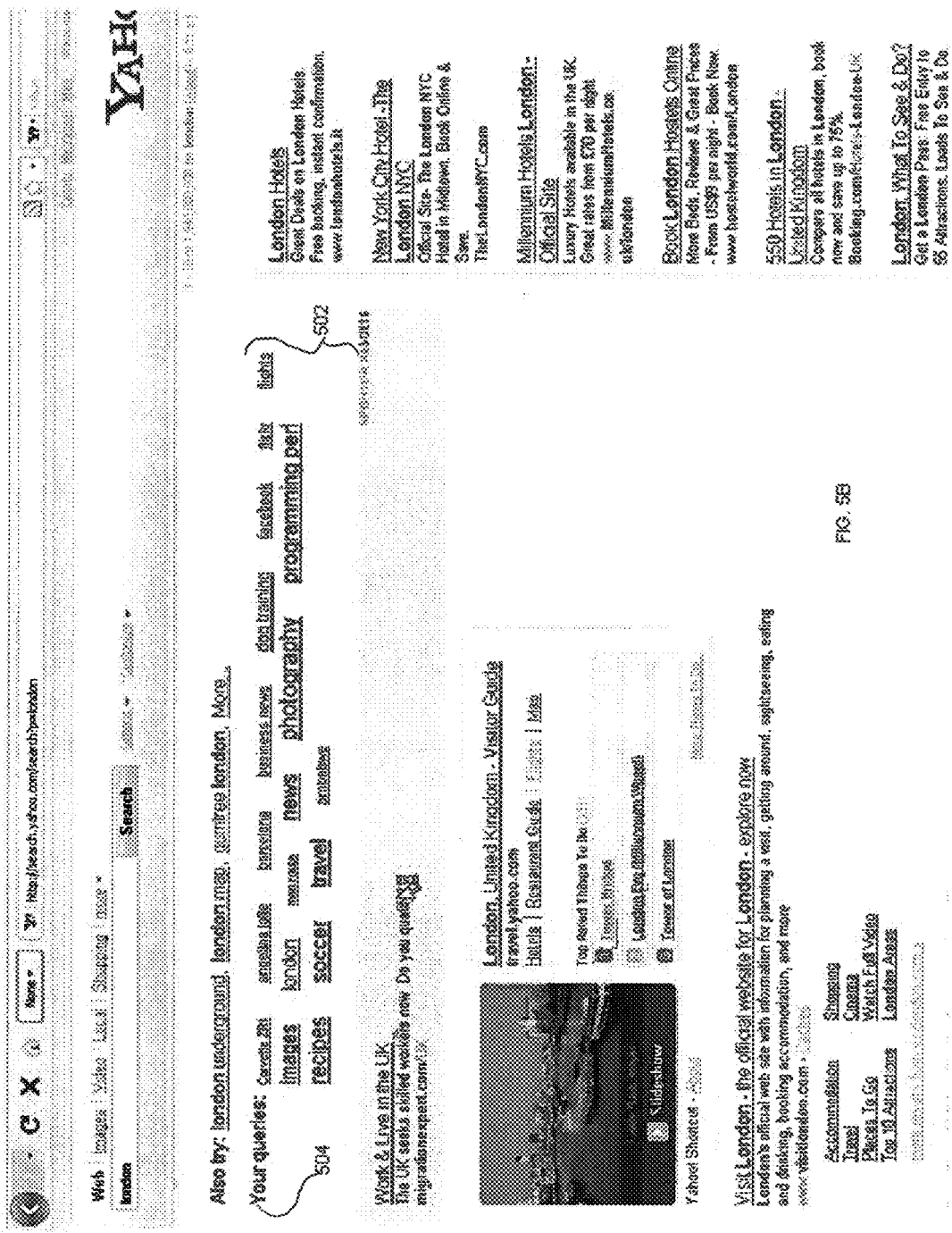
FIG. 5B is a screen shot illustrating an example graphical user interface via which results of the search executed in FIG. 5A may be provided.

FIG. 5B is a screen shot illustrating an example graphical user interface via which results of the search executed in FIG. 5A may be provided. As shown in FIG. 5B, the results for the search query are provided, where the search results identify one or more documents. Moreover, in this example, the set of bookmarks appear at 502 at the top of the web page next to "Your queries" title 504. Accordingly, the user interface facilitates the search process experienced by the user.

Figure 6A:
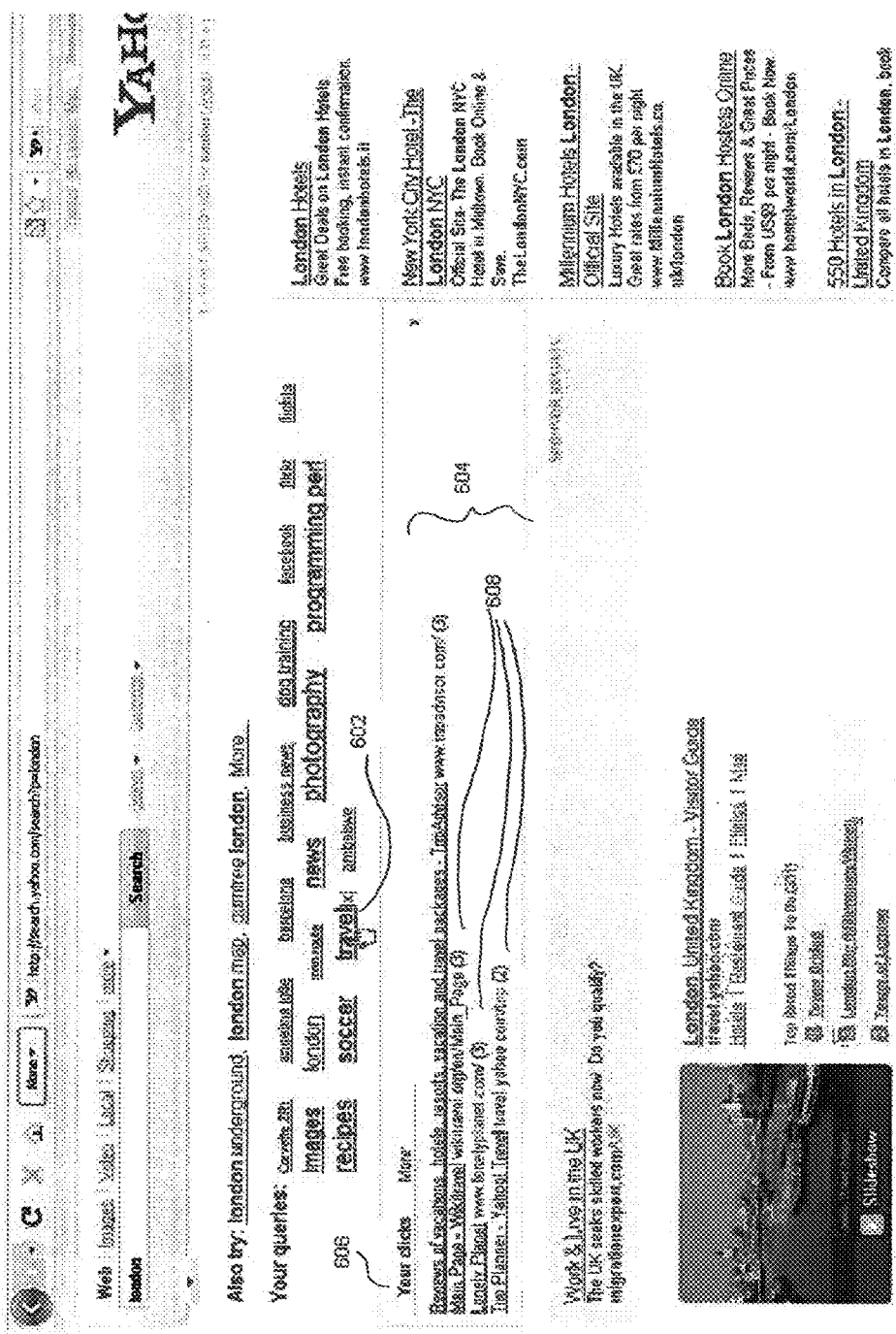
FIG. 6A is a screen shot illustrating an example graphical user interface via which prior search results that have been clicked may be accessed in association with one of the bookmarks shown in FIG. 5B.

FIG. 6A is a screen shot illustrating an example graphical user interface via which prior search results that have been clicked may be accessed in association with one of the bookmarks shown in FIG. 5B. When the user places the mouse over bookmark "travel" 602, previous search results that have been clicked by the user are presented in a portion of the user interface as shown at 604. Specifically, as shown in this example, the documents provided in previous search results that have been clicked by the user are shown under the title "Your clicks" 606. Each of the documents in this example has an indicator associated therewith at 608 that indicates the frequency with which these documents have been selected (e.g., viewed) by the user.

Figure 6B:
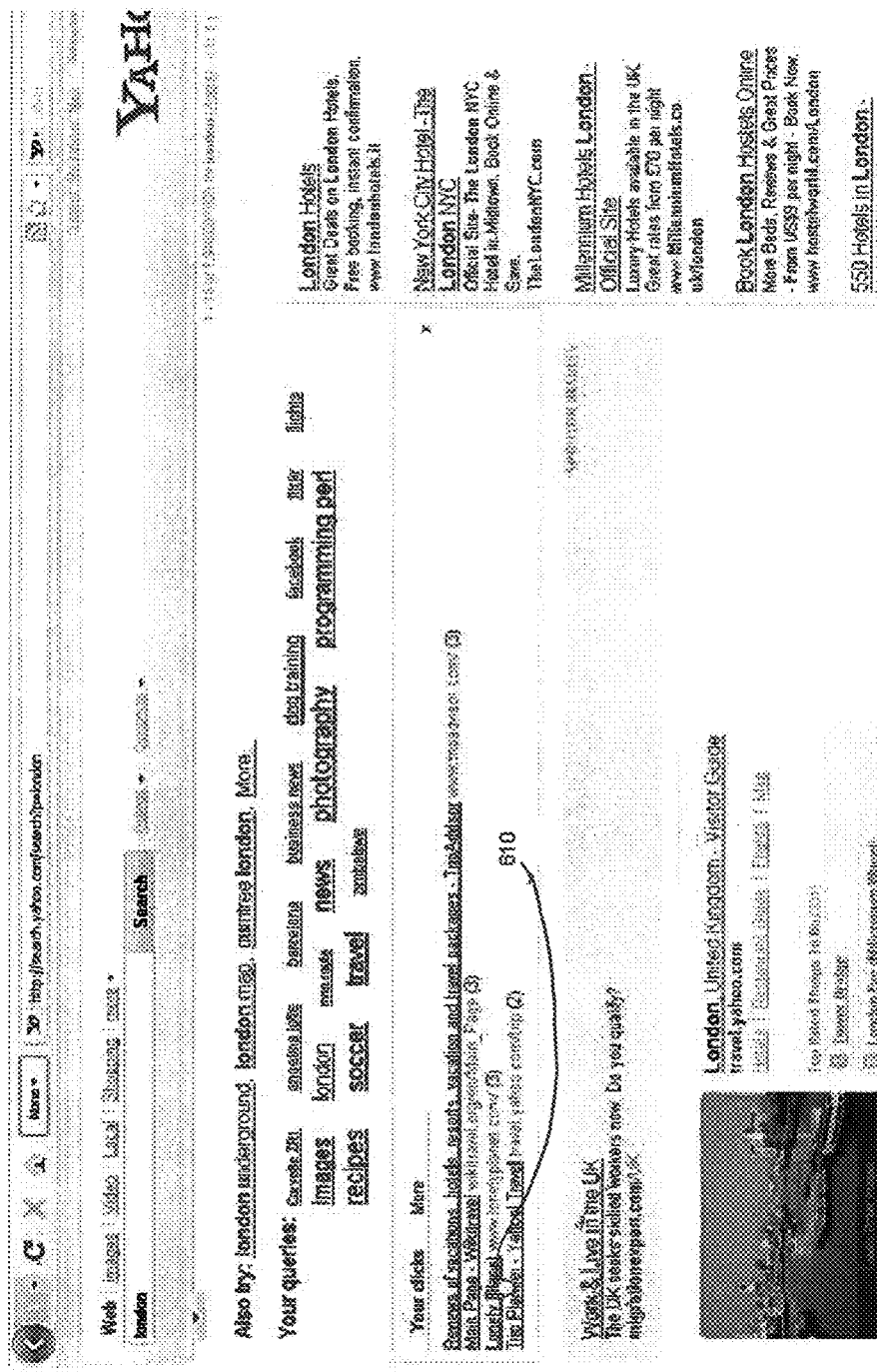
FIG. 6B is the screen shot of FIG. 6A after one of the prior search results associated with a bookmark has been selected.

FIG. 6B is the screen shot of FIG. 6A after one of the prior search results associated with a bookmark has been selected. When the user clicks on the "Lonely Planet" document as shown at 610, the user is redirected to the URL of the "Lonely Planet" website.

Figure 7A:
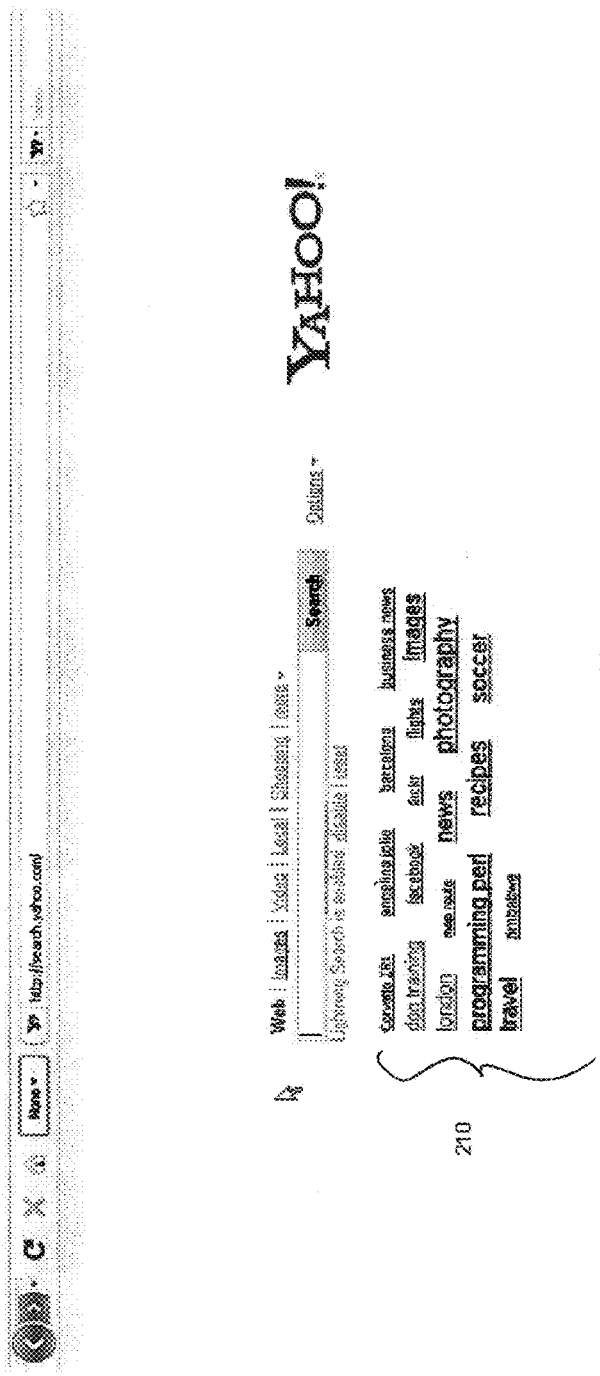
FIG. 7A is a screen shot illustrating an example graphical user interface illustrating an automatically generated set of bookmarks.

The user may then return to the search portal. FIG. 7A is a screen shot illustrating an example graphical user interface illustrating an automatically generated set of bookmarks as described above. As shown in this example, the set of bookmarks 210 does not include the bookmark "New York."

Figure 7B:
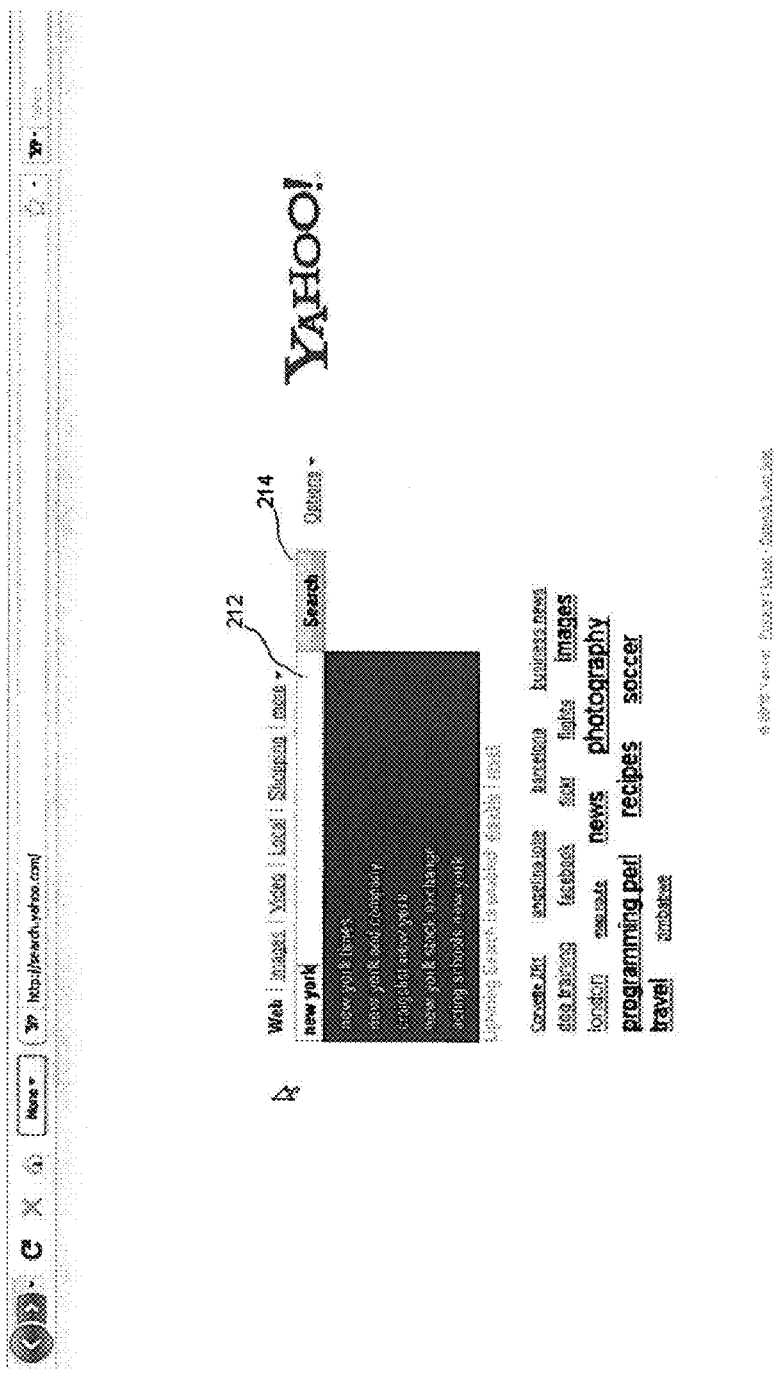
FIG. 7B is a screen shot illustrating an example search query that has been entered into a search text box.

FIG. 7B is a screen shot illustrating an example search query that has been entered into the search text box 212. In this example, the user types the search query "New York" and clicks on the "Search" button 214 to execute the search query.

Figure 8:
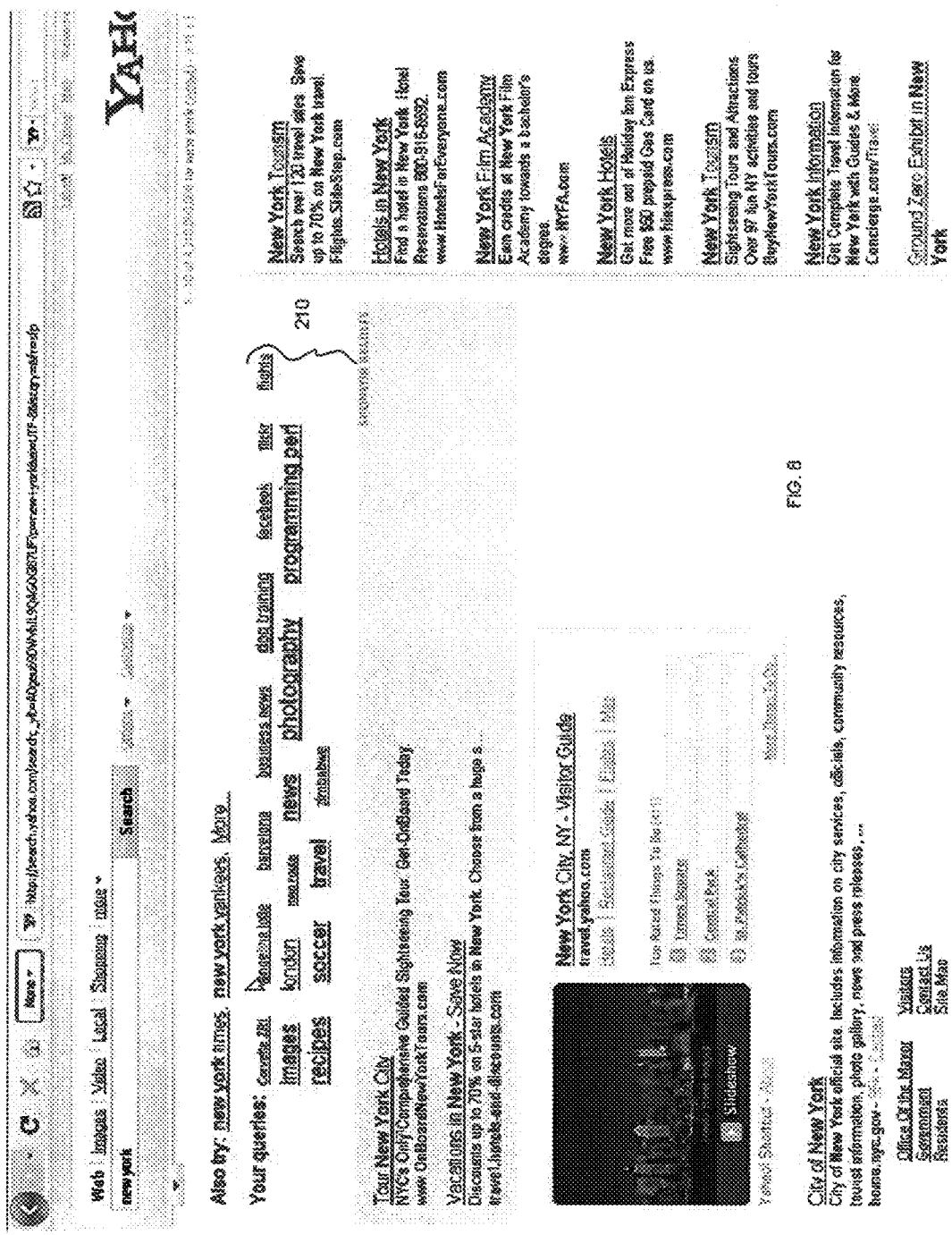
FIG. 8 is a screen shot illustrating an example graphical user interface illustrating the search results corresponding to the search query submitted as shown in FIG. 7B.

FIG. 8 is a screen shot illustrating an example graphical user interface illustrating the search results corresponding to the search query submitted as shown in FIG. 7B. Specifically, a search results page including the search results corresponding to the search query "New York" is presented. As shown in this example, the user interface includes the set of bookmarks 210. In accordance with one embodiment, a bookmark is automatically stored after one of the search results is clicked by the user. Alternatively, in accordance with another embodiment, a bookmark may be automatically stored merely based upon the search query that has been submitted.

Figure 9A:
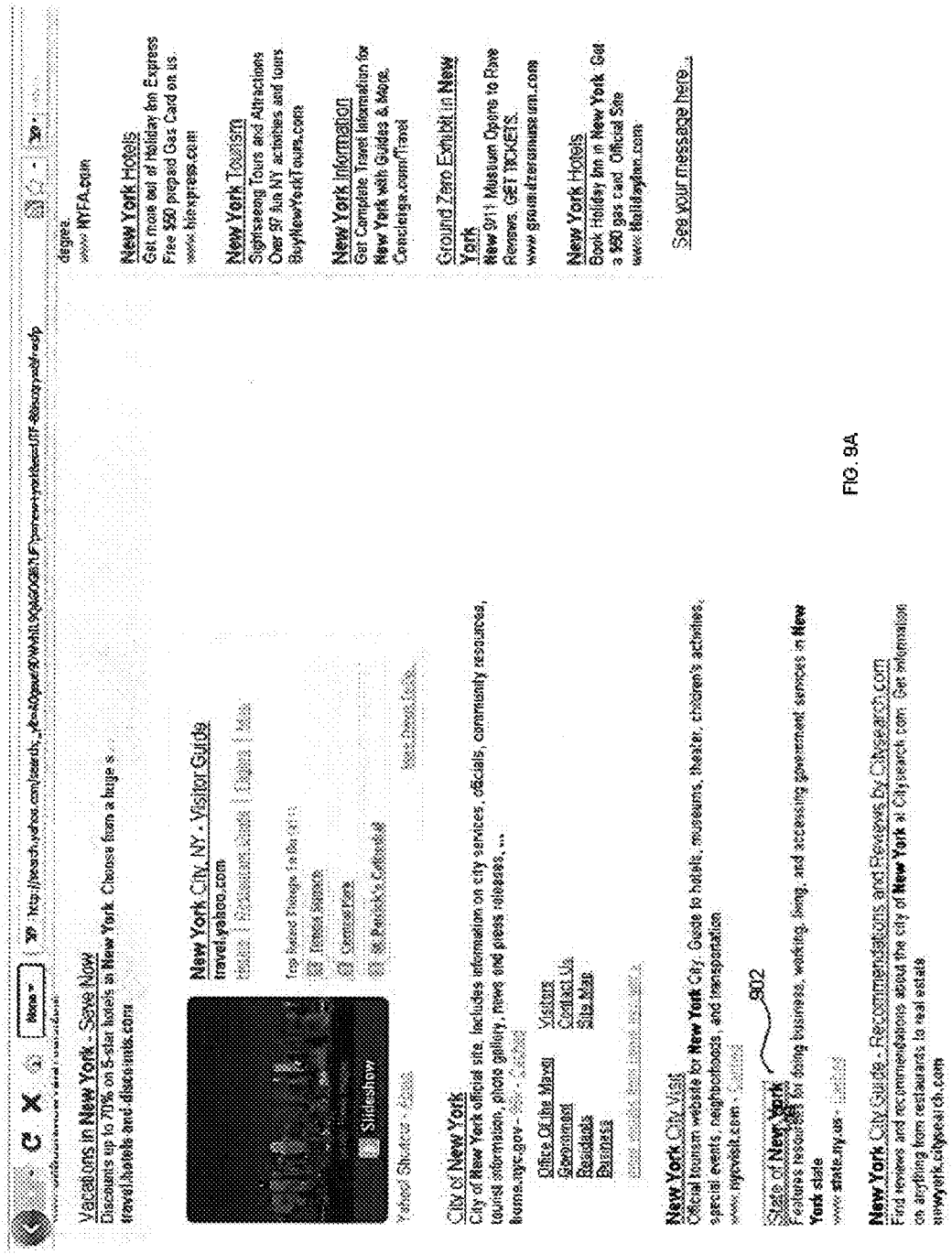
FIG. 9A is an example screen shot illustrating the selection of one of the search results provided in FIG. 8.

FIG. 9A is an example screen shot illustrating the selection of one of the search results provided in FIG. 8. The user clicks on one of the documents presented in the search results. Specifically, the user clicks on the "State of New York" search result as shown at 902. A bookmark identifying the search query previously submitted by the user may then be automatically stored and associated with the user, client, or web browser.

Figure 9B:
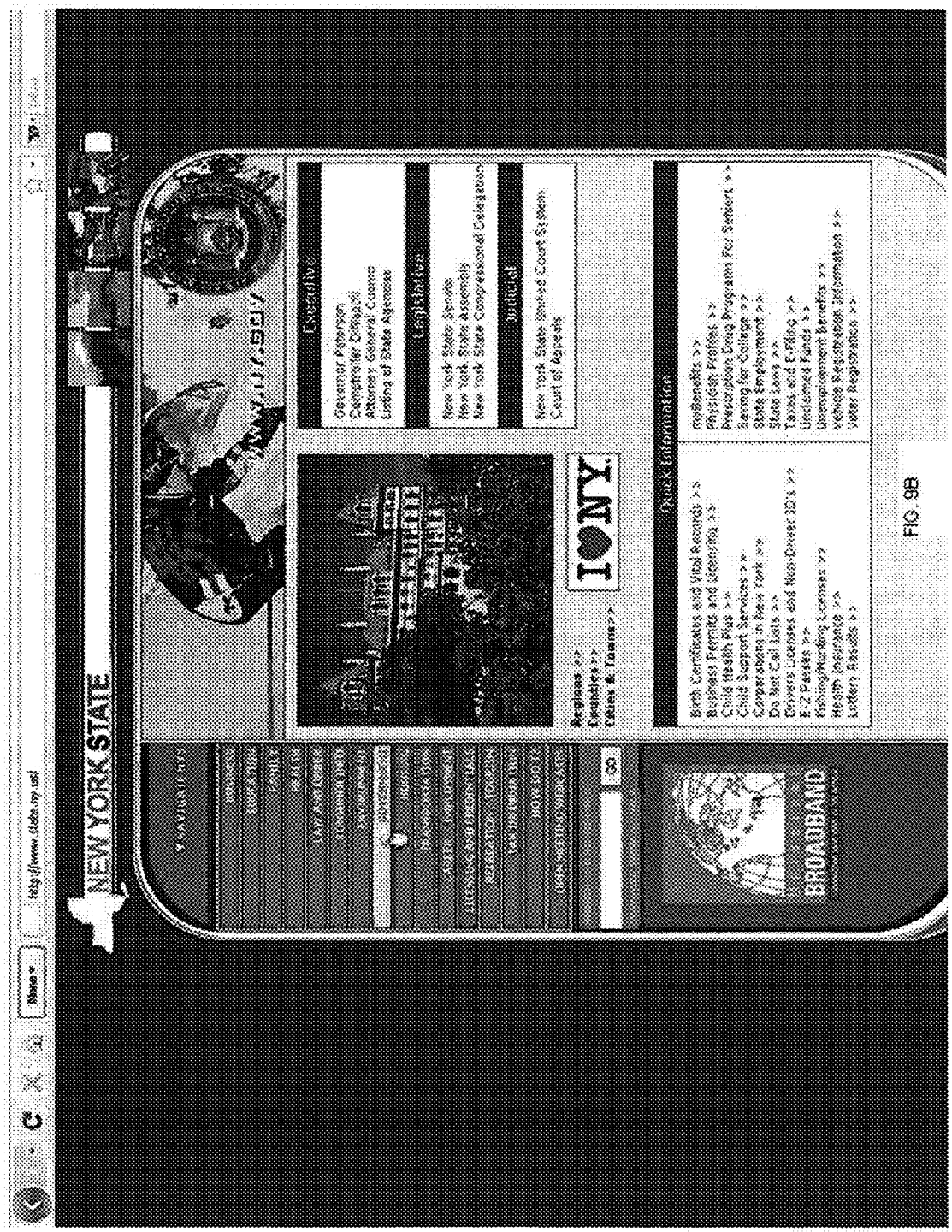
FIG. 9B is an example screen shot illustrating a resulting web page after the selection of the search result as shown in FIG. 9A.

FIG. 9B is an example screen shot illustrating a resulting web page after the selection of the search result as shown in FIG. 9A. As shown, the user is redirected to the web page "http://www.state.ny.us/." The user may return to the search portal, at which time the set of bookmarks may be automatically retrieved and provided in the user interface. Specifically, the search engine may automatically retrieve the set of bookmarks from a memory coupled to the search engine. Alternatively, the web browser may automatically retrieve the set of bookmarks from user data of the browser.

Figure 10A:
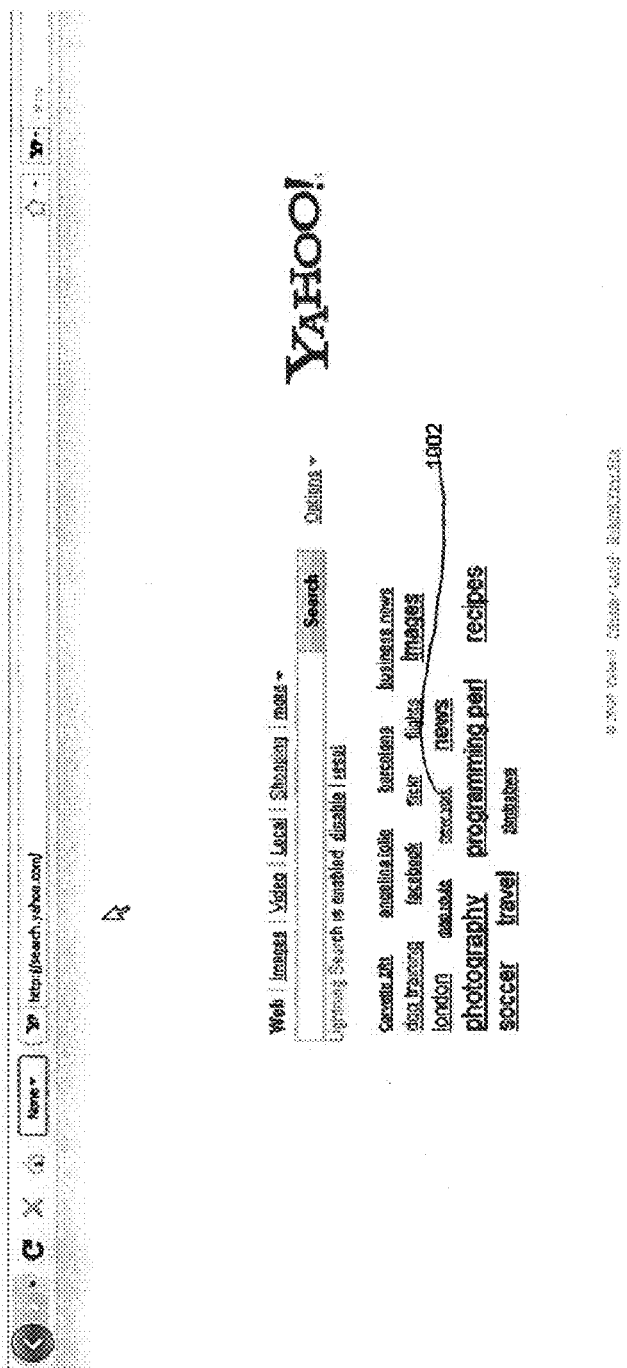
FIG. 10A is an example screen shot illustrating that the automatically generated set of bookmarks includes a new bookmark corresponding to the search query submitted in FIG. 7B.

FIG. 10A is an example screen shot illustrating that the automatically generated set of bookmarks includes a new bookmark corresponding to the search query submitted in FIG. 7B. Specifically, a bookmark "New York" 1002 corresponding to the search query previously submitted by the user now appears in the set of bookmarks 210 that are presented, since the user has clicked on one of the search results corresponding to the search query "New York."

At least one link to a set of one or more of the documents that have previously been selected in association with the search query may also be automatically provided (e.g., displayed). For instance, the user may then submit a request to view those search results associated with the bookmark that have previously been clicked by the user, client, or web browser. For instance, the user may indicate a selection of the automatically generated bookmark by submitting a request. In this example, such a request is submitted by simply moving the mouse over the bookmark.

Figure 10B:
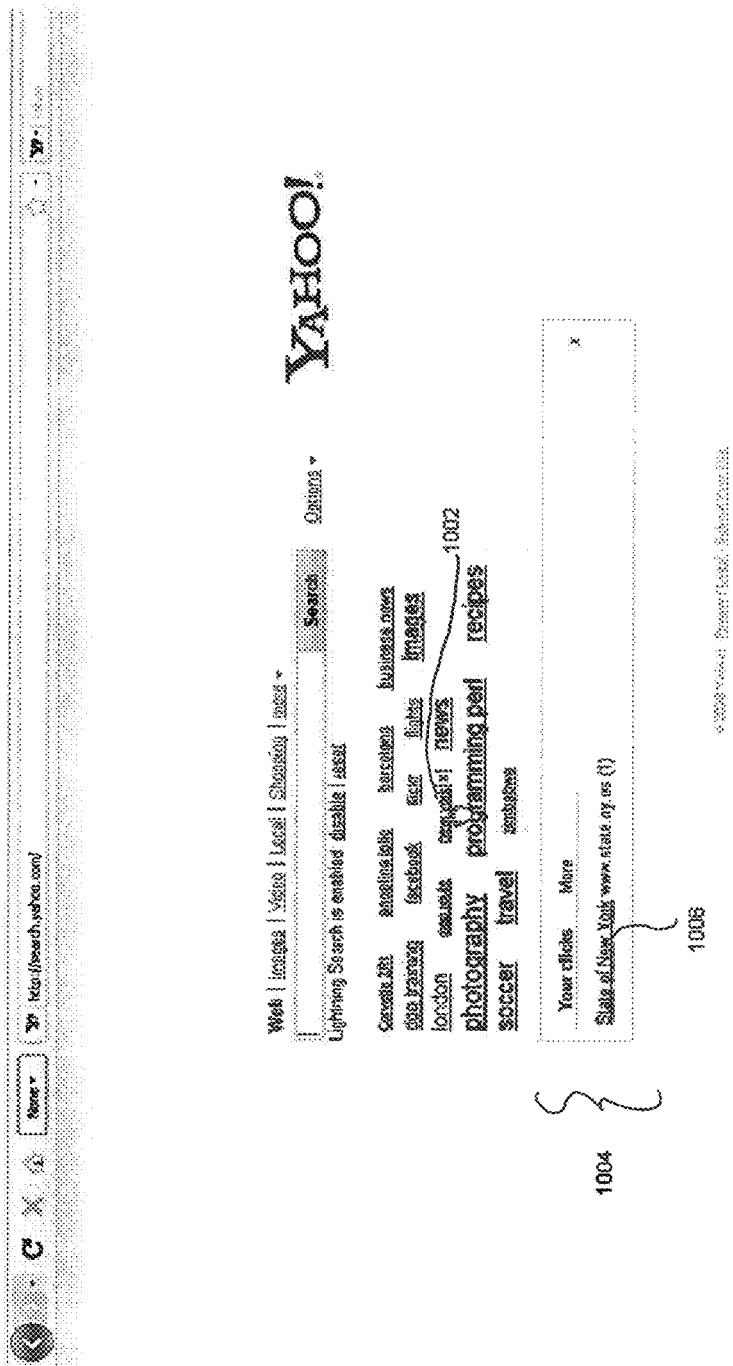
FIG. 10B is a screen shot illustrating example search results associated with the new bookmark shown in FIG. 10A that have previously been clicked.

FIG. 10B is a screen shot illustrating example search results associated with the new bookmark shown in FIG. 10A that have previously been clicked. In this example, the user moves the mouse over the bookmark "New York" 1002 in order to view the previously clicked search results 1004 associated with the bookmark. The previously clicked search results 1004 are identified in this example by the heading "Your clicks." As shown at 1006, the "State of New York" document appears in the previously clicked search results 1004. Specifically, a hypertext link associated with the document may be provided. If the user were to click on the document, the user would be redirected to the "State of New York" website.

Figure 10C:
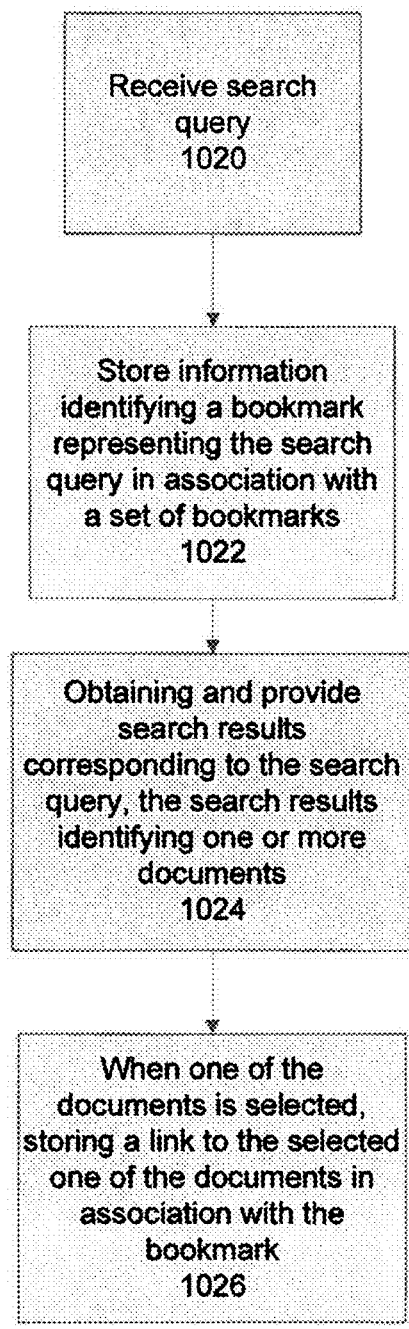
FIG. 10C is a process flow diagram illustrating an example method of automatically storing bookmarks in accordance with various embodiments.

FIG. 10C is a process flow diagram illustrating an example method of automatically storing bookmarks in accordance with various embodiments. Upon receiving a search query at 1020, information identifying a bookmark representing the search query may be automatically stored in association with a set of bookmarks at 1022. For instance, the information may be stored in a memory of a network device such as a search server or in user data of a browser. The set of bookmarks may be associated with a user, client, or web browser that has submitted the search query. Search results corresponding to the search query may be automatically obtained and provided at 1024, where the search results identify one or more documents. When one of the documents is selected, a link to the selected one of the documents may be automatically stored in association with the bookmark at 1026 such that a set of one or more previously clicked documents are associated with the bookmark. For instance, the link may be stored in a memory of a network device such as a search server or in user data of a browser. In accordance with one embodiment, the information identifying the bookmark is not stored until one of the documents produced by the corresponding search query has been selected.

As set forth above, the search results that are generated and provided in response to a search query or the selection of a bookmark may include one or more links corresponding to one or more documents, wherein the links may be stored in association with a bookmark that identifies the search query (e.g., a selected bookmark).

Figure 11:
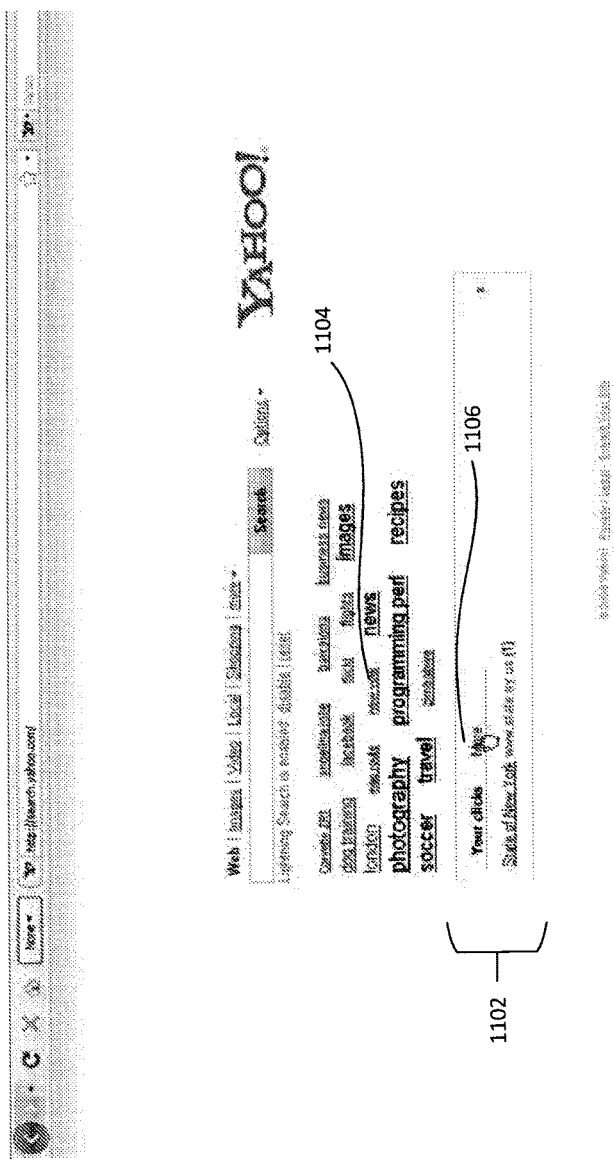
FIG. 11 is a screen shot illustrating an example graphical user interface via which aggregate search results may be provided.

FIG. 11 is a screen shot illustrating an example graphical user interface via which aggregate search results may be provided. Once a bookmark has been selected, the user may view aggregate search results corresponding to the selected bookmark. The aggregate search results may include search results corresponding to multiple categories. In one embodiment, the aggregate search results are provided independent of whether the search results were previously clicked.

Aggregate search results 1102 may be provided in response to a user request. For instance, the user may select of one of a set of bookmarks as shown at 1104. In this example, the selected bookmark "new york" represents a corresponding search query. In this example, the user may view a list of aggregate search results by clicking on the "More" tab 1106.

Aggregate search results may be obtained by automatically categorizing a search query into one or more of a plurality of categories. The search query may then be automatically executed for each of the one or more of the plurality of categories in order to obtain search results corresponding to each of the one or more of the plurality of categories.

The categories may include Yahoo! properties such as Search, Answers, Business, Buzz, and Flickr. Each of the plurality of categories may correspond to or otherwise identify a different database, data source, web site, or document type. For instance, a Flickr category may include images, while another category may include video clips. Thus, a search query may be automatically executed against multiple databases, data sources, web sites, and/or document types.

Figure 12:
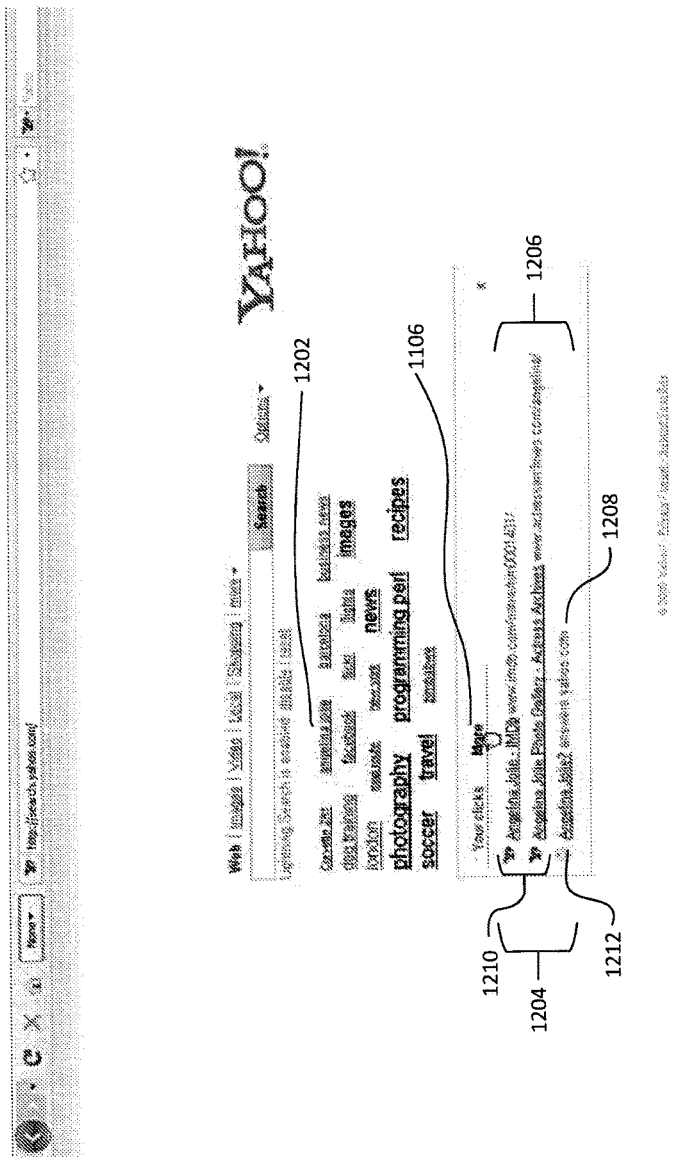
FIG. 12 is a screen shot illustrating example aggregate search results associated with one of the bookmarks shown in FIG. 11.

FIG. 12 is a screen shot illustrating example aggregate search results associated with one of the bookmarks shown in FIG. 11. In one embodiment, when the user places the mouse over the bookmark "angelina jolie" 1202, aggregate search results 1204 associated with the bookmark 1202 may be obtained and provided under the "More" tab 1106. The user may then view these aggregate search results 1204 by clicking on the "More" tab 1106.

As shown in this example, there are two Yahoo! Search results 1206 and one Yahoo! Answers result 1208. The Yahoo! Search Results 1206 may have a corresponding indicator 1210 indicating that the results 1206 are associated with the category Yahoo! Search. Similarly, the Yahoo! Answers result 1208 may have a corresponding indicator 1212 indicating that the result 1208 is associated with the category Yahoo! Answers.

In accordance with one embodiment, the selection of bookmark "angelina jolie" 1202 and/or the "More" tab 1106 may initiate the execution of a search performed for the corresponding search query "angelina jolie" in order to obtain the aggregate search results for multiple categories. In accordance with another embodiment, the selection of bookmark "angelina jolie" 1202 and/or the "More" tab 1106 may merely retrieve the aggregate search results from memory. In other words, when the user clicks on the "More" tab 1106, this may be interpreted as a request for the aggregate search results that have been obtained for the search query.

Figure 13:
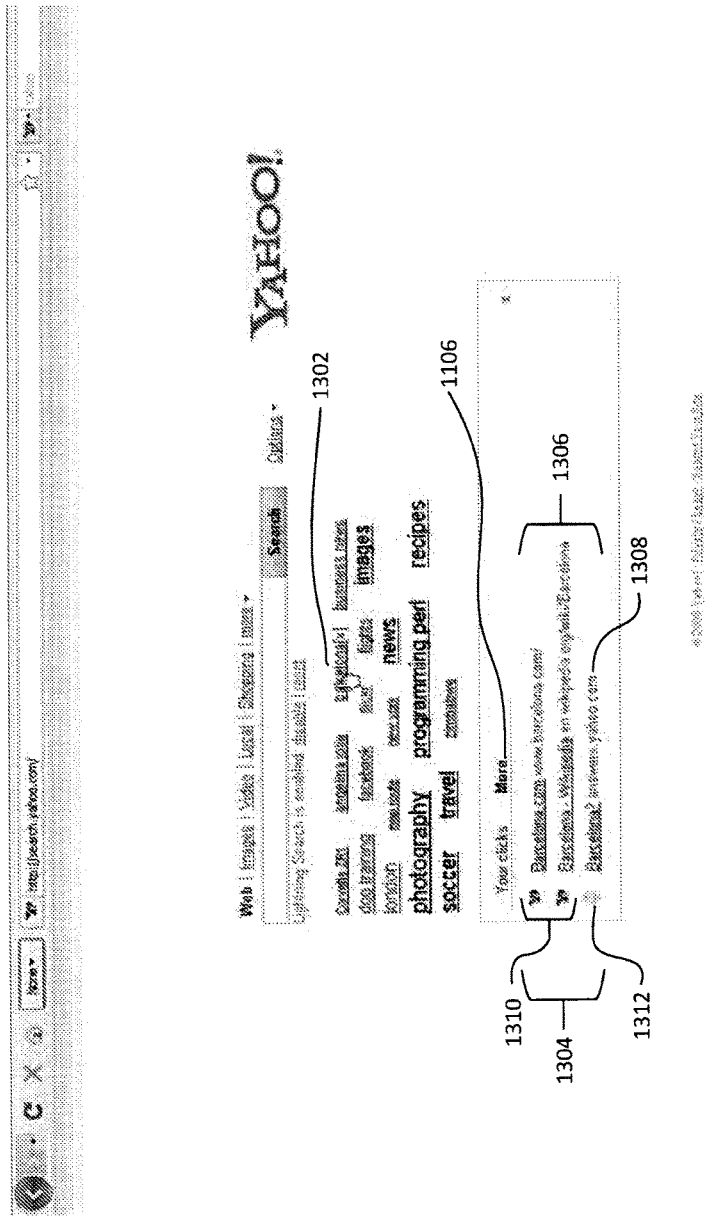
FIG. 13 is a screen shot illustrating example aggregate search results associated with another one of the bookmarks shown in FIG. 11.

FIG. 13 is a screen shot illustrating example aggregate search results associated with another one of the bookmarks shown in FIG. 11. When the user places the mouse over the bookmark "barcelona" 1302, aggregate search results 1304 associated with the bookmark 1302 may be obtained and provided under the "More" tab 1106. The user may then view these aggregate search results 1304 by clicking on the "More" tab 1106.

As shown in this example, there are two Yahoo! Search results 1306 and one Yahoo! Answers result 1308. The Yahoo! Search Results 1306 may have a corresponding indicator 1310 indicating that the results 1306 are associated with the category Yahoo! Search. Similarly, the Yahoo! Answers result 1308 may have a corresponding indicator 1312 indicating that the result 1308 is associated with the category Yahoo! Answers.

Figure 14:
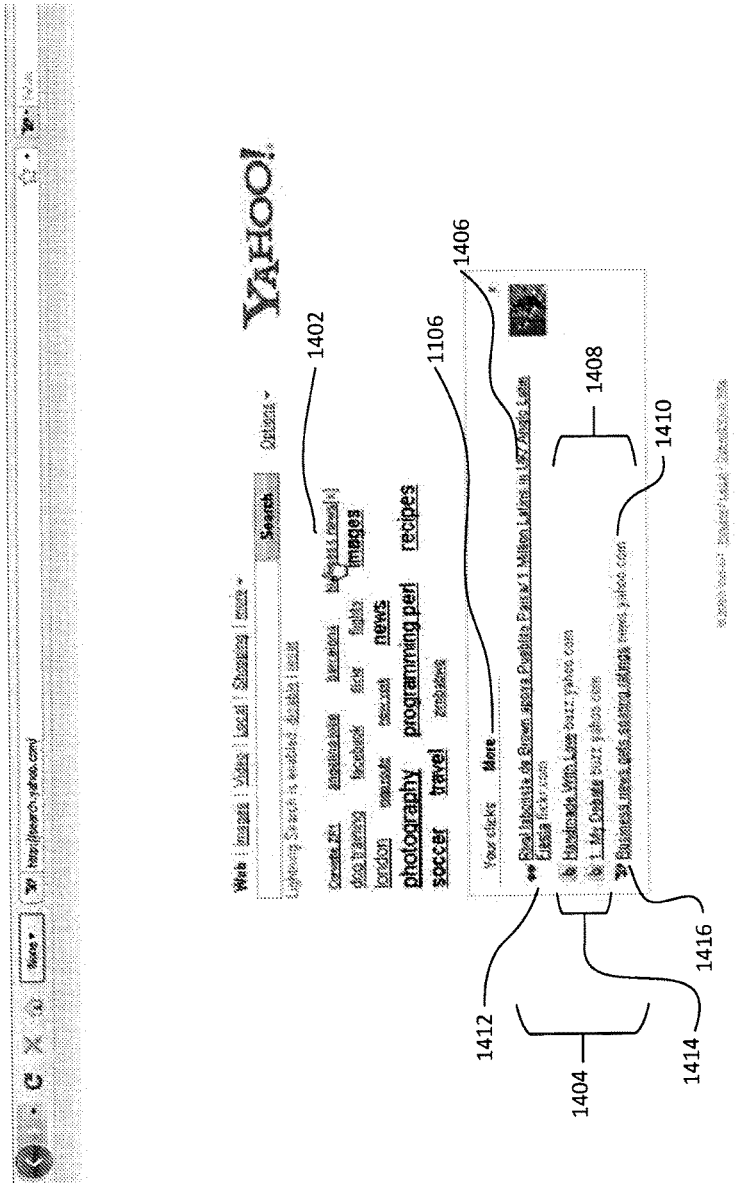
FIG. 14 is a screen shot illustrating example aggregate search results associated with yet another one of the bookmarks shown in FIG. 11.

FIG. 14 is a screen shot illustrating example aggregate search results associated with yet another one of the bookmarks shown in FIG. 11. When the user places the mouse over the bookmark "business news" 1402, aggregate search results 1404 associated with the bookmark 1402 may be obtained and provided under the "More" tab 1106. The user may then view these aggregate search results 1404 by clicking on the "More" tab 1106.

As shown in this example, there is one Yahoo! Flickr result 1406, two Yahoo! Buzz results 1408 and one Yahoo! Search result 1410. The Yahoo! Flickr result 1406 may have a corresponding indicator 1412 indicating that the result 1406 is associated with the category Yahoo! Flickr. Similarly, the Yahoo! Buzz results 1408 may have a corresponding indicator 1414 indicating that the results 1408 is associated with the category Yahoo! Buzz, while the Yahoo! Search result 1410 may have a corresponding indicator 1416 indicating that the result 1410 is associated with the category Yahoo! Search.

Figure 15A:
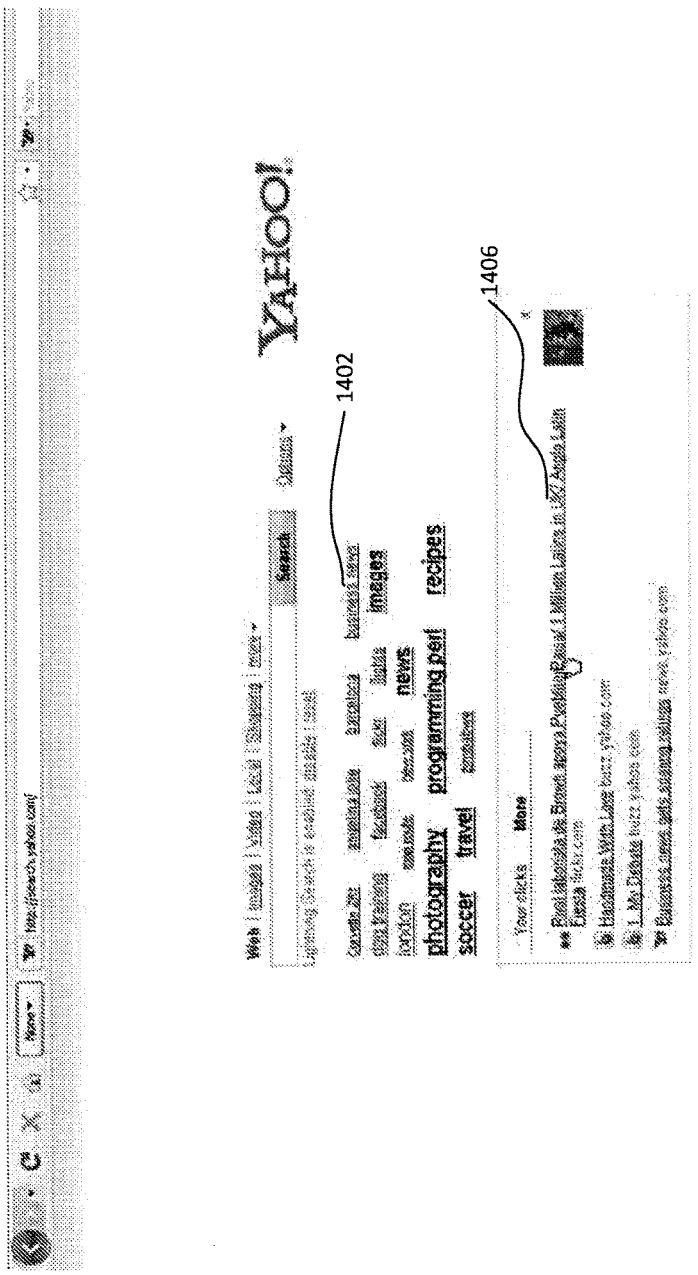
FIG. 15A is the screen shot of FIG. 14 after one of the aggregate search results has been selected.

FIG. 15A is the screen shot of FIG. 14 after one of the aggregate search results has been selected. As shown in this example, the user clicks on the Flickr result 1406 corresponding to the "business news" 1402 bookmark.

Figure 15B:
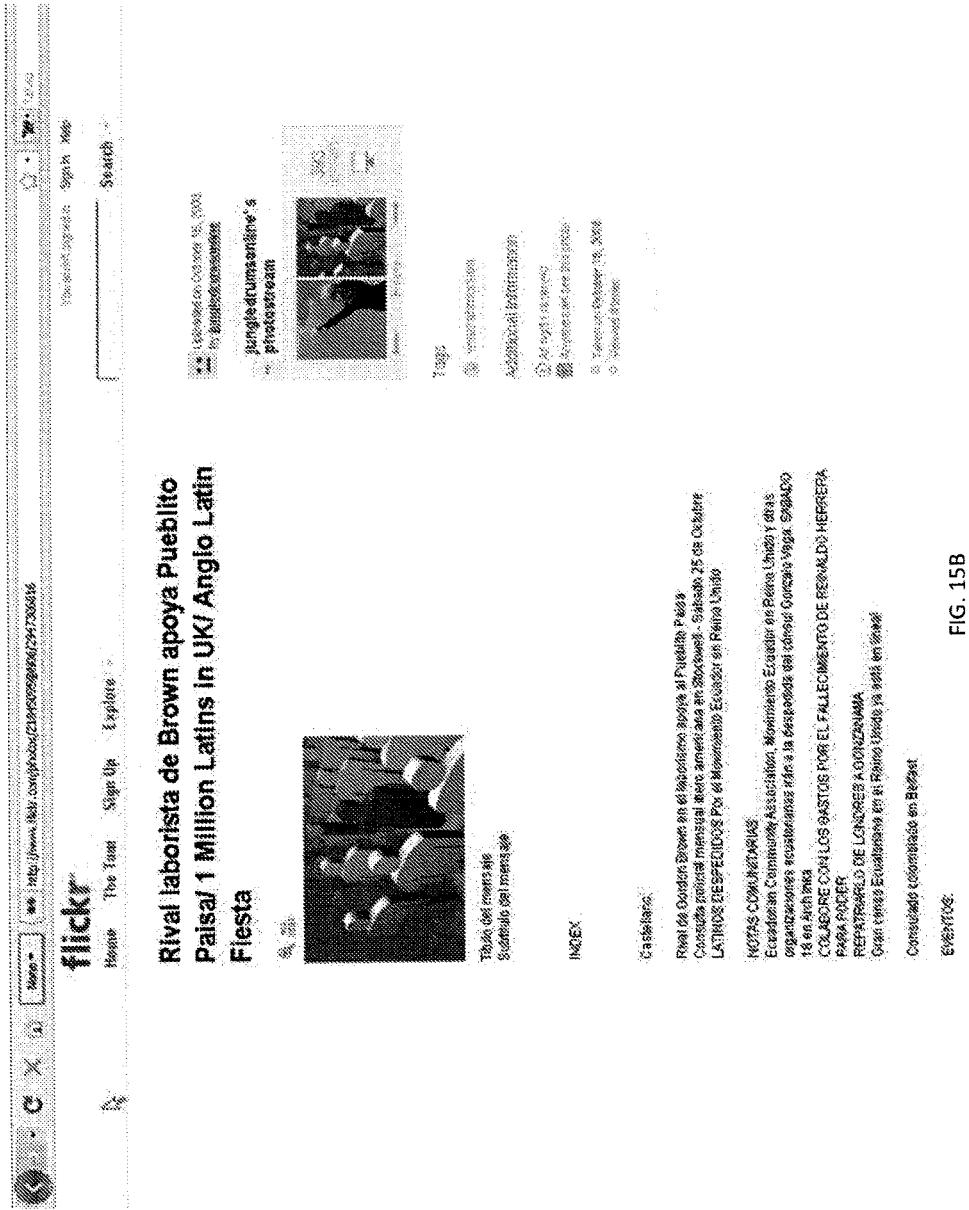
FIG. 15B is a screen shot illustrating a resulting web page corresponding to the selected one of the aggregate search results shown in FIG. 15A.

FIG. 15B is a screen shot illustrating a resulting web page corresponding to the selected one of the aggregate search results shown in FIG. 15A. As shown in this example, the user is redirected to a Flickr photo page identified by the Flickr result 1406 of FIG. 15A.

Figure 16A:
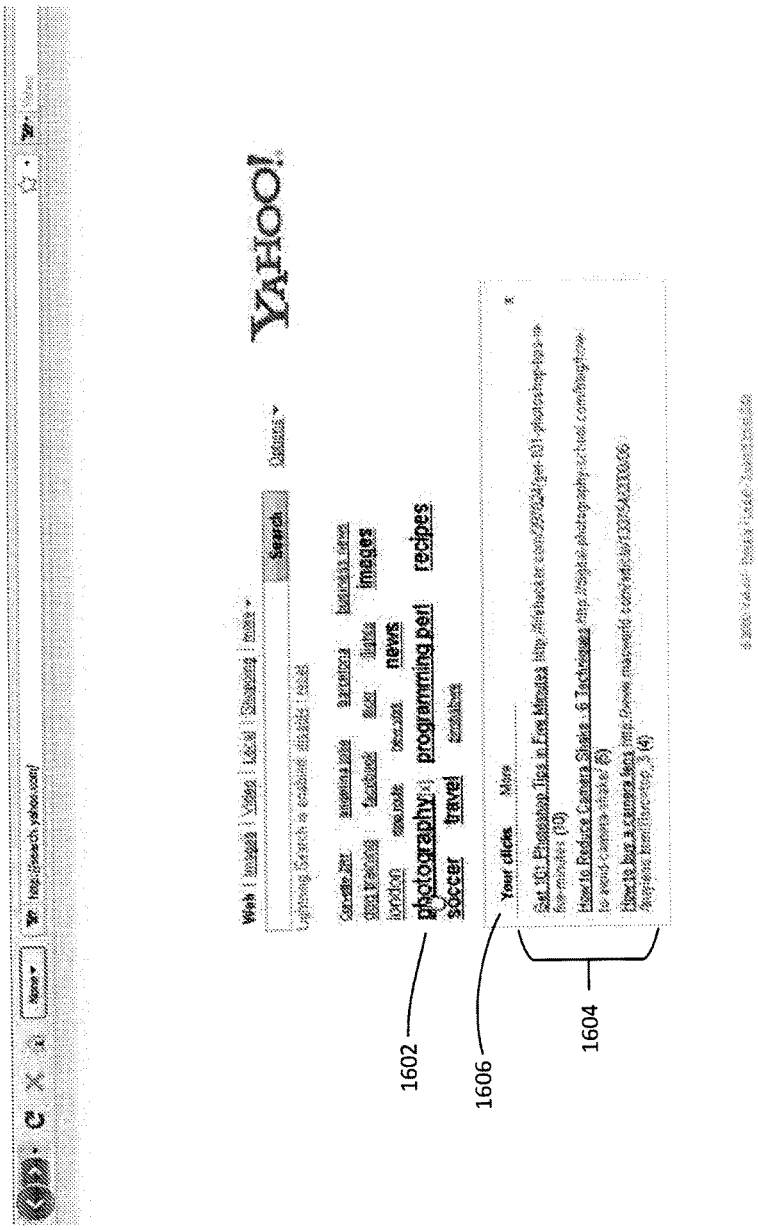
FIG. 16A is a screen shot illustrating previously clicked search results in association with a selected one of the bookmarks shown in FIG. 11.

FIG. 16A is a screen shot illustrating previously clicked search results in association with a selected one of the bookmarks shown in FIG. 11. As shown in FIG. 16A, when the user clicks on the "photography" bookmark 1602, the user may view the user clicks 1604 identifying those documents that the user has previously clicked after the user clicks on the "Your clicks" tab 1606.

Figure 16B:
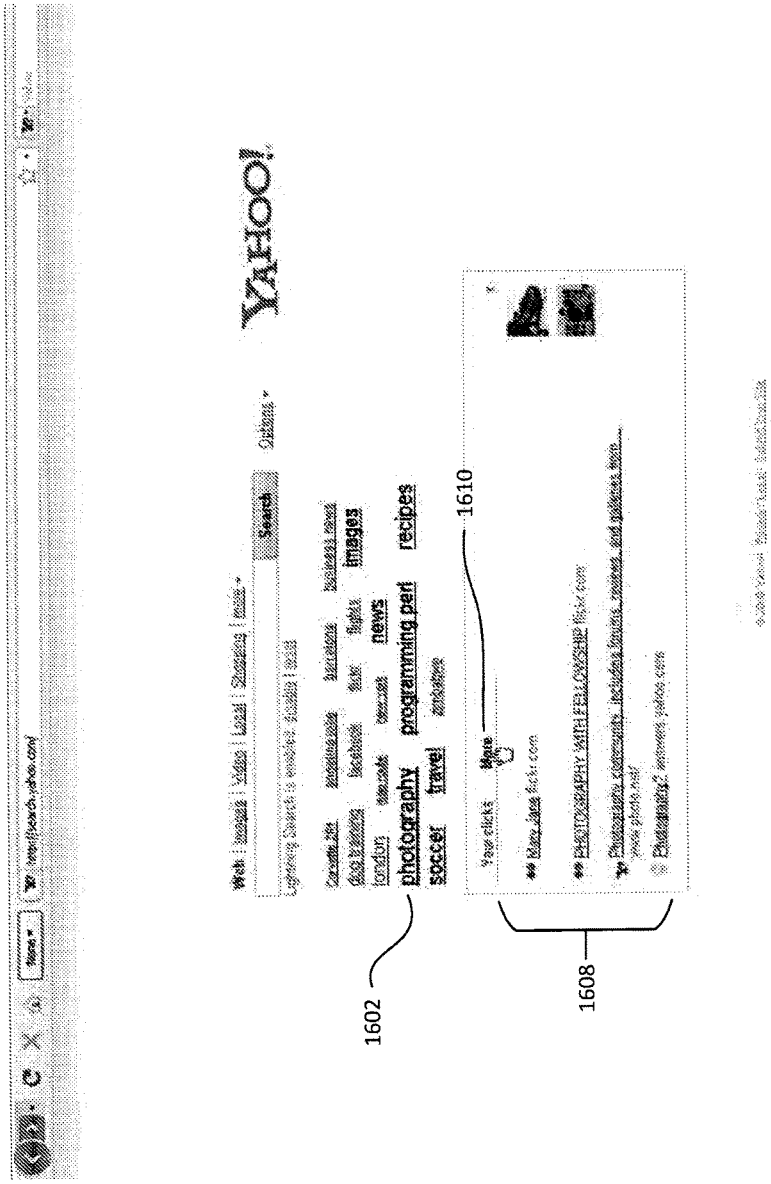
FIG. 16B is a screen shot illustrating aggregate search results associated with the bookmark selected in FIG. 16A.

FIG. 16B is a screen shot illustrating aggregate search results associated with the bookmark selected in FIG. 16A. As shown in FIG. 16B, after the user clicks on the "photography" bookmark 1602, the user may view the aggregate search results 1608 by clicking on the "More" tab 1610.

Figure 16C:
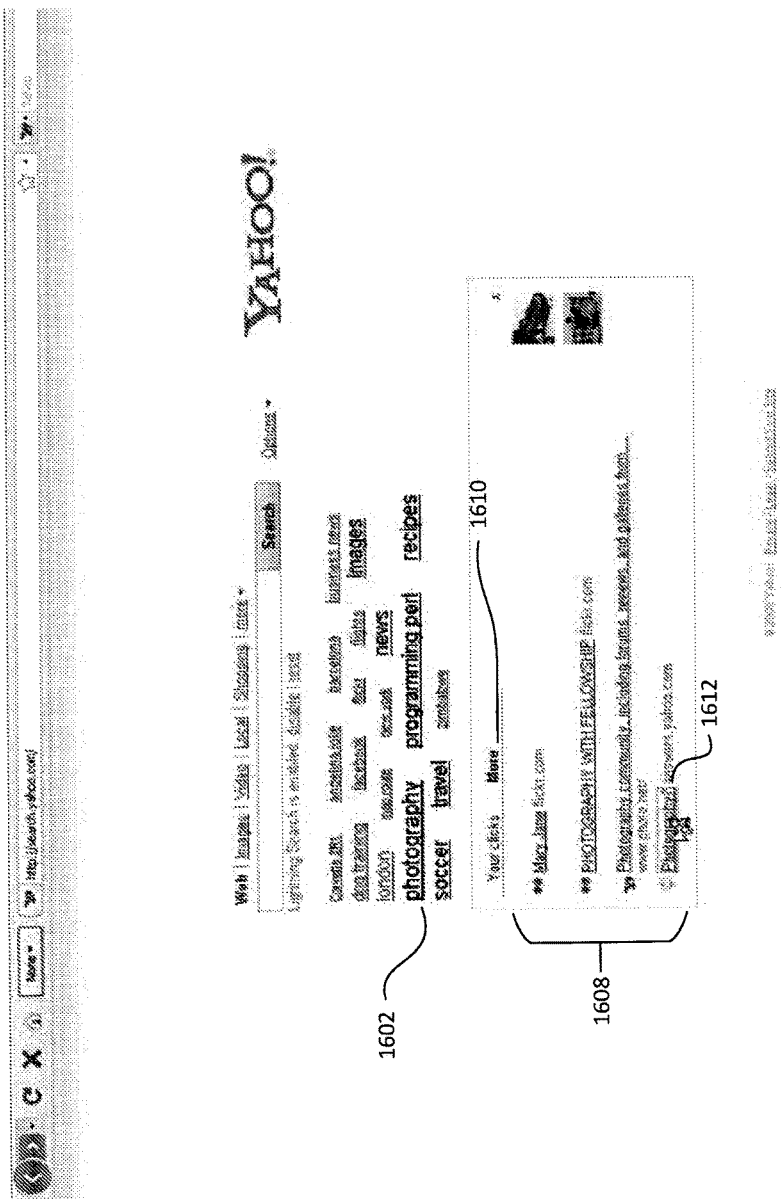
FIG. 16C is a screen shot illustrating the selection of one of the aggregate search results provided in FIG. 16B.

FIG. 16C is a screen shot illustrating the selection of one of the aggregate search results provided in FIG. 16B. As shown in this example, the user clicks on the Yahoo! Answers result 1612.

Figure 16D:
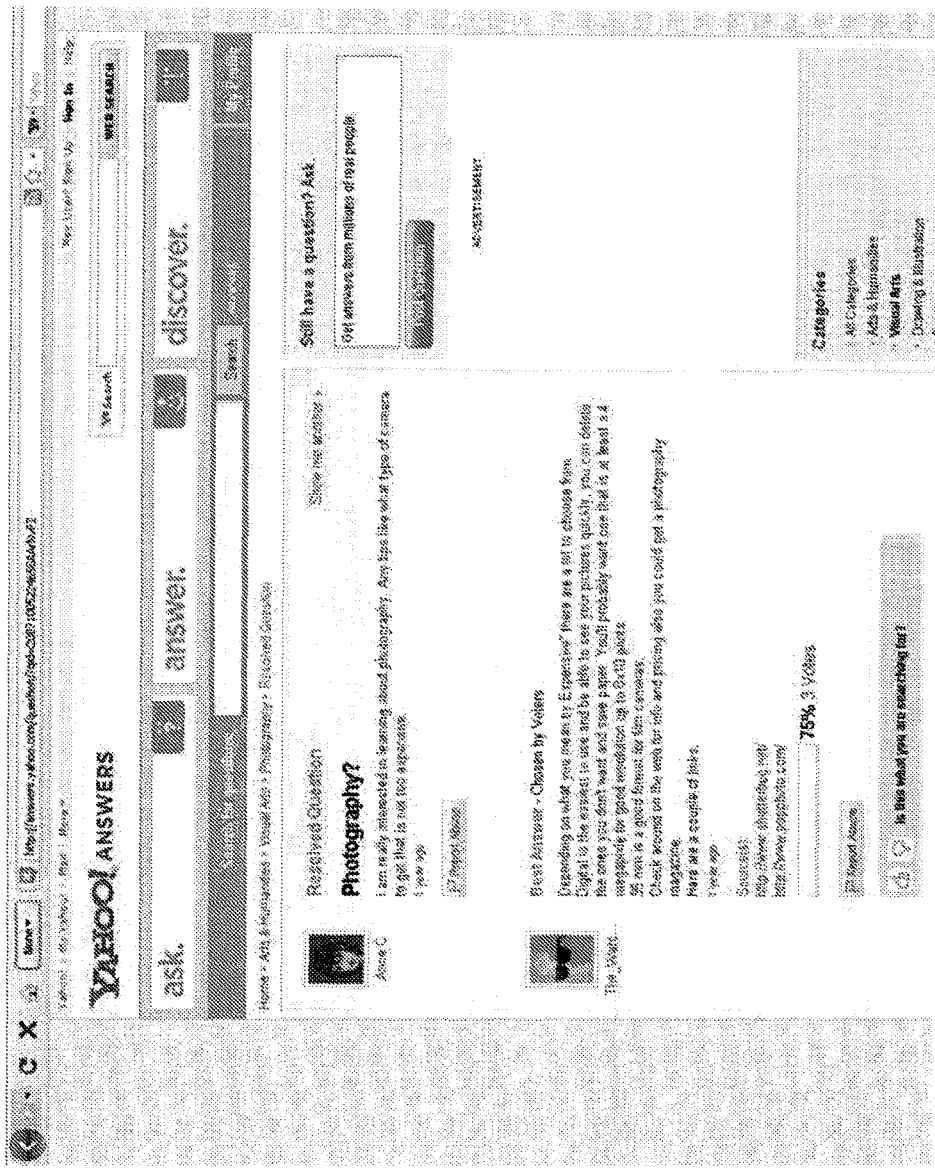
FIG. 16D is a screen shot illustrating a resulting web page in association with the selected one of the aggregate search results as shown in FIG. 16B.

FIG. 16D is a screen shot illustrating a resulting web page in association with the selected one of the aggregate search results as shown in FIG. 16B. Specifically, the user is redirected to the Yahoo! Answers result page corresponding to the link identified at 1612 of FIG. 16C.

Figure 17A:
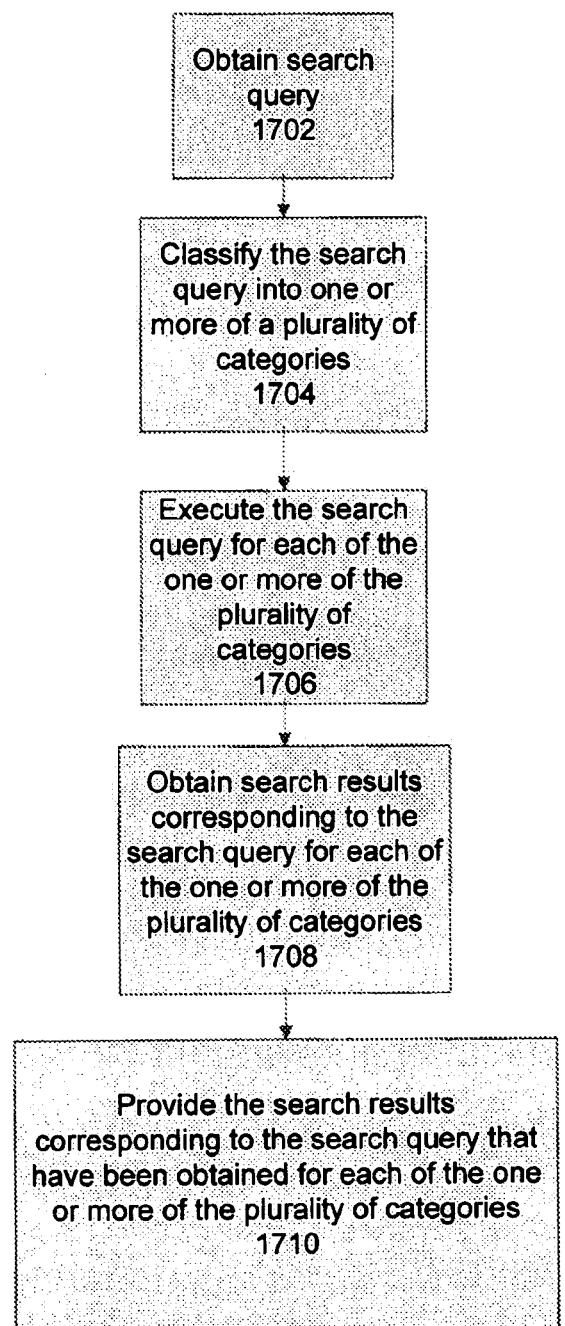
FIG. 17A is a process flow diagram illustrating an example method of providing aggregate search results in accordance with various embodiments.

FIG. 17A is a process flow diagram illustrating an example method of providing aggregate search results in accordance with various embodiments. A search server may obtain a search query at 1702. The search server may classify the search query into one or more of a plurality of categories at 1704. Classification may be performed via a variety of algorithms, which may involve matching search terms of the search query with words in the category titles. Other more complex algorithms may involve further processing, which may include the matching of synonyms of the search terms, as well as synonyms of the words in the category titles. The search server may then execute the search query for each of the one or more of the plurality of categories at 1706 and obtain search results corresponding to the search query for each of the one or more of the plurality of categories at 1708. The search server may then provide (e.g., display) the search results corresponding to the search query that have been obtained for each of the one or more of the plurality of categories 1710.

The search results may be obtained and provided by populating a template corresponding to each of the one or more categories. For instance, each of the categories may have a template associated therewith that identifies one or more fields for which data is to be obtained. Example fields include an http link or a photo. Such a template may be stored statically or generated dynamically. For instance, the search engine may identify one or more properties for a corresponding one of the categories for which search results are to be obtained. The search results for the identified properties may then be obtained for the corresponding category.

Figure 17B:
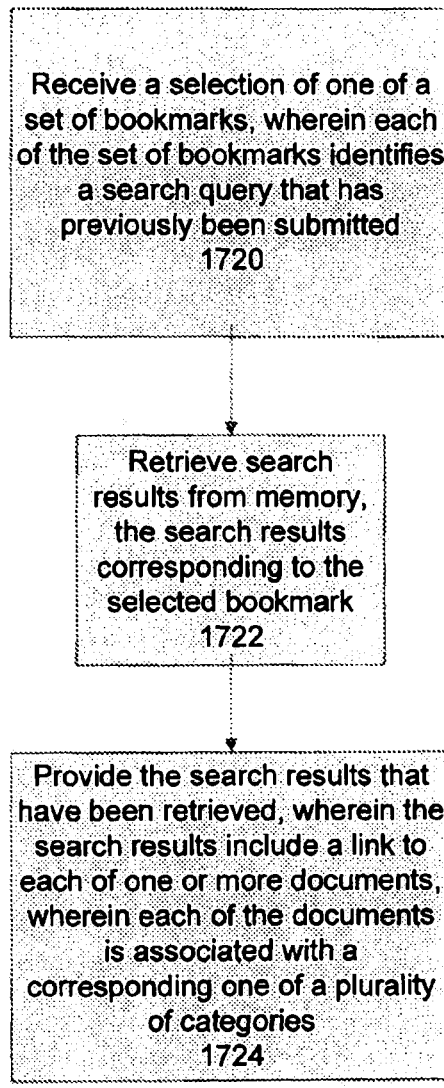
FIG. 17B is a process flow diagram illustrating another example method of providing aggregate search results in accordance with various embodiments.

FIG. 17B is a process flow diagram illustrating another example method of providing aggregate search results in accordance with various embodiments. A selection of one of a set of bookmarks may be received at 1720, wherein each of the set of bookmarks identifies a search query that has previously been submitted. Search results may be retrieved from memory at 1722, the search results corresponding to the selected bookmark. The search results that have been retrieved may then be provided at 1722, wherein the search results include a link to each of one or more documents, wherein each of the documents is associated with a corresponding one of a plurality of categories.

Figure 18:
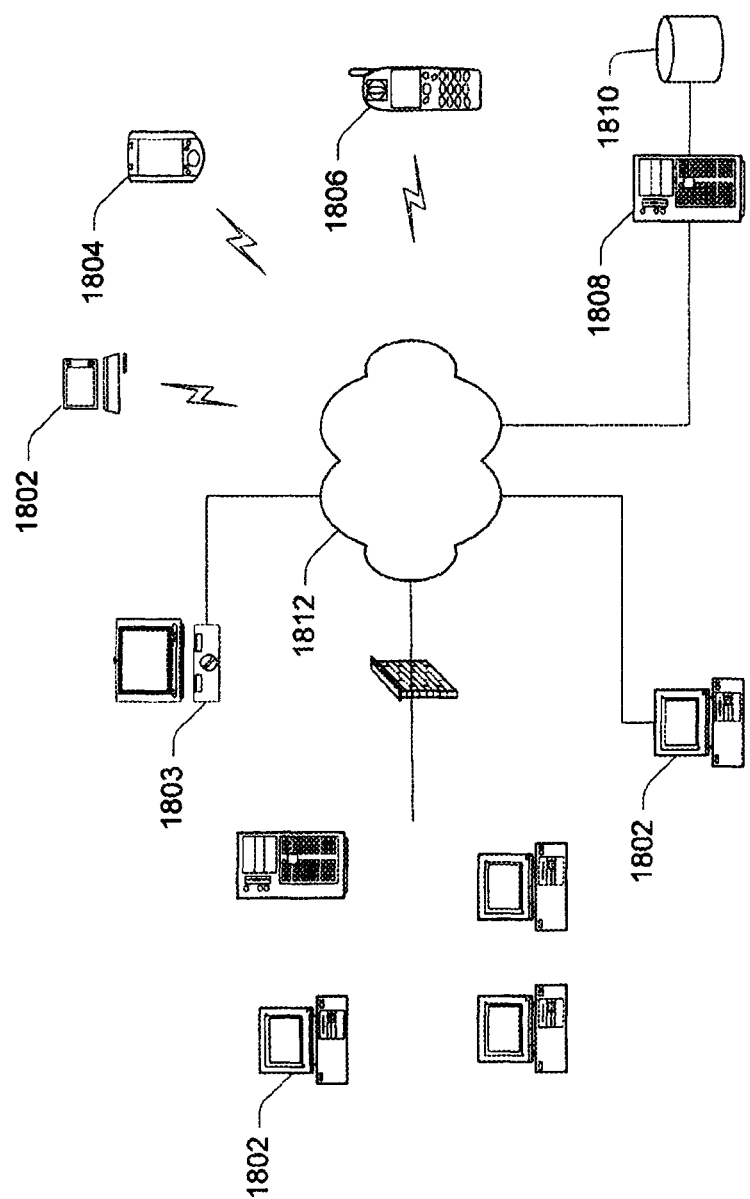
FIG. 18 is a simplified diagram of a network environment in which various embodiments may be implemented.

Embodiments of the present invention may be employed to automatically store, generate and provide bookmarks, previously clicked documents, and/or aggregate search results in any of a wide variety of computing contexts. For example, as illustrated in FIG. 18, implementations are contemplated in which users interact with a diverse network environment via any type of computer (e.g., desktop, laptop, tablet, etc.) 1802, media computing platforms 1803 (e.g., cable and satellite set top boxes and digital video recorders), handheld computing devices (e.g., PDAs) 1804, cell phones 1806, or any other type of computing or communication platform.

And according to various embodiments, input that is processed in accordance with the invention may be obtained using a wide variety of techniques. For example, a search query may be obtained from a user's interaction with a local application, web site or web-based application or service and may be accomplished using any of a variety of well known mechanisms for obtaining information from a user. However, it should be understood that such methods of obtaining input from a user are merely examples and that a search query may be obtained in many other ways.

Once a search query has been classified and aggregate search results have been obtained, aggregate search results may be processed according to the invention in some centralized manner. This is represented in FIG. 18 by server 1808 and data store 1810 which, as will be understood, may correspond to multiple distributed devices and data stores. The invention may also be practiced in a wide variety of network environments (represented by network 1812) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques of the present invention may be implemented in any suitable combination of software and/or hardware system, such as a web-based server or desktop computer system. The search apparatus and/or web browser of this invention may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store query logs, bookmarks (e.g., automatically generated bookmarks), hypertext links to previously clicked documents associated with the bookmarks, aggregate search results, categories, templates, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 19:
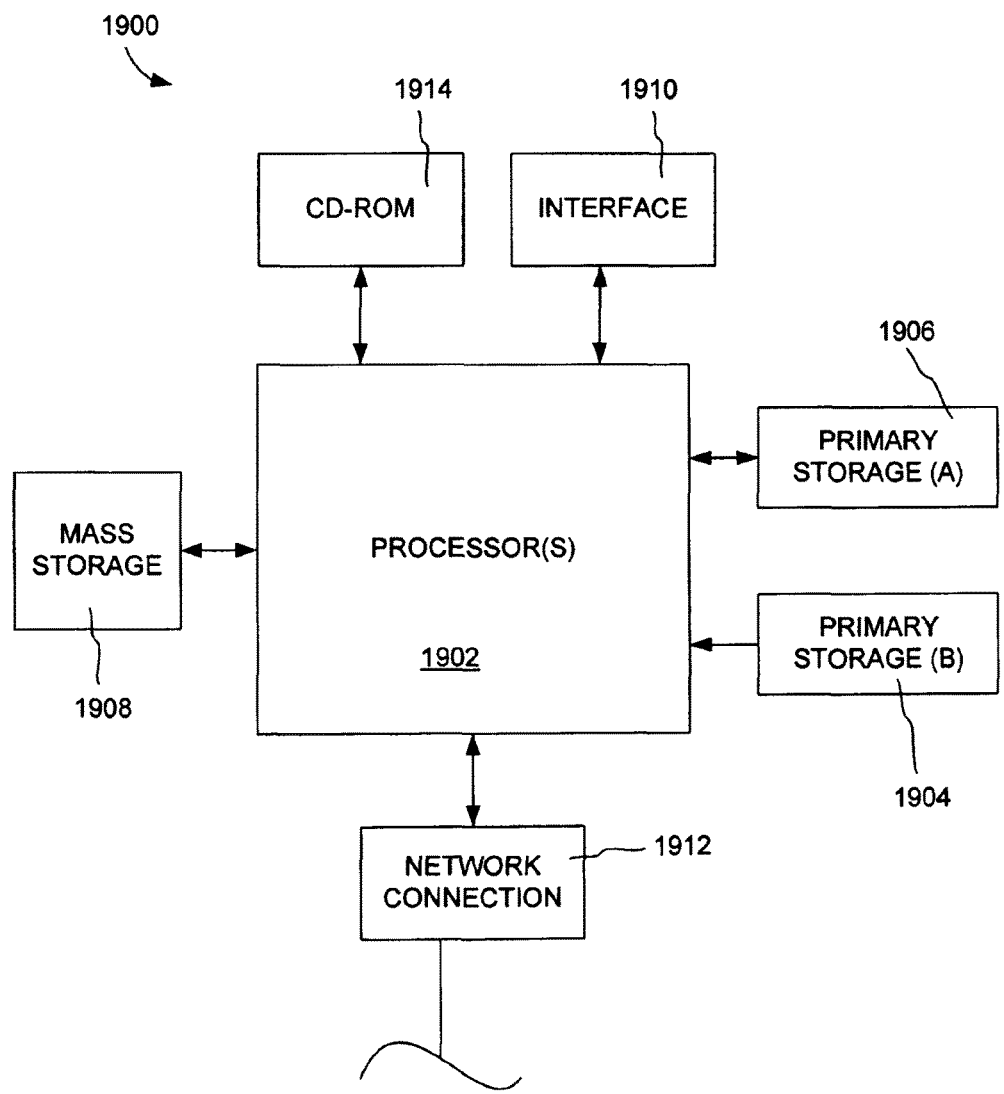
FIG. 19 illustrates an example computer system in which various embodiments may be implemented.

FIG. 19 illustrates a typical computer system that, when appropriately configured or designed, can serve as a system of this invention. The computer system 1900 includes any number of processors 1902 (also referred to as central processing units, or CPUs) that are coupled to storage devices including primary storage 1906 (typically a random access memory, or RAM), primary storage 1904 (typically a read only memory, or ROM). CPU 1902 may be of various types including microcontrollers and microprocessors such as programmable devices (e.g., CPLDs and FPGAs) and unprogrammable devices such as gate array ASICs or general purpose microprocessors. As is well known in the art, primary storage 1904 acts to transfer data and instructions uni-directionally to the CPU and primary storage 1906 is used typically to transfer data and instructions in a bi-directional manner. Both of these primary storage devices may include any suitable computer-readable media such as those described above. A mass storage device 1908 is also coupled bi-directionally to CPU 1902 and provides additional data storage capacity and may include any of the computer-readable media described above. Mass storage device 1908 may be used to store programs, data and the like and is typically a secondary storage medium such as a hard disk. It will be appreciated that the information retained within the mass storage device 1908, may, in appropriate cases, be incorporated in standard fashion as part of primary storage 1906 as virtual memory. A specific mass storage device such as a CD-ROM 1914 may also pass data uni-directionally to the CPU.

CPU 1902 may also be coupled to an interface 1910 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1902 optionally may be coupled to an external device such as a database or a computer or telecommunications network using an external connection as shown generally at 1912. With such a connection, it is contemplated that the CPU might receive information from the network, or might output information to the network in the course of performing the method steps described herein.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
receiving a search query via a web browser of a client;
obtaining a set of search results corresponding to the search query;
providing the set of search results corresponding to the search query;
automatically storing information pertaining to a bookmark in user data of the web browser, wherein the bookmark identifies the search query that was received via the web browser of the client;
retrieving information pertaining to a set of bookmarks including the bookmark from the user data of the web browser; and
providing, by the web browser, the set of bookmarks underneath a search text box of a user interface, wherein each of the set of bookmarks is user-selectable, wherein each of the set of bookmarks identifies a corresponding search query that was previously received via the web browser of the client;
wherein bookmarks provided by the web browser do not identify search queries received via other web browsers or client devices.

2. The method as recited in claim 1, further comprising:
storing a link to at least one of the set of search results in association with the bookmark.

3. The method as recited in claim 2, wherein the link to at least one of the set of search results is stored in association with the bookmark in response to a selection of the one of the set of search results by the user.

4. The method as recited in claim 1, further comprising:
classifying the search query into one or more of a plurality of categories;
executing the search query for each of the one or more of the plurality of categories;
wherein obtaining a set of search results includes obtaining search results corresponding to the search query for each of the one or more of the plurality of categories; and
wherein providing the set of search results includes providing the search results corresponding to the search query that have been obtained for each of the one or more of the plurality of categories, wherein providing the search results corresponding to the search query that have been obtained for each of the one or more of the plurality of categories includes providing an indicator identifying each of the one or more of the plurality of categories in association with corresponding documents in the provided search results.

5. The method as recited in claim 1, further comprising:
in response to a selection of one of the set of search results via the web browser, storing a hyperlink to the selected one of the set of search results such that the hyperlink is associated with the bookmark.

6. The method as recited in claim 1, further comprising:
receiving, via the client, a selection of one of the set of bookmarks;
retrieving, by the web browser of the client, a set of links to documents that have previously been selected via the web browser in association with the search query identified by the selected bookmark; and providing the set of links to documents that have previously been selected via the web browser in association with the search query identified by the selected bookmark.

7. The method as recited in claim 6, wherein each of the documents is associated with a corresponding one of a plurality of categories, the method further comprising:

providing an indicator identifying each of one or more of the plurality of categories in association with corresponding document(s) in the provided set of previously clicked documents.

8. The method as recited in claim 7, wherein each of the plurality of categories corresponds to a different web site, data source, database, or document type.

9. The method as recited in claim 1, wherein the set of bookmarks is provided when the web browser returns to a search portal.

10. The method as recited in claim 1, further comprising:

determining, for each bookmark in the set of bookmarks, a frequency with which the search query identified by the bookmark is executed via the web browser of the client; and wherein a first subset of the set of bookmarks for which search queries are executed more frequently via the web browser of the client are displayed more prominently than a second subset of the set of bookmarks for which search queries are executed less frequently via the web browser of the client.

11. The method as recited in claim 10, wherein the first subset of the set of bookmarks and the second subset of the set of bookmarks are displayed using different display characteristics including one or more of font size, color, bolding, or underlining.

12. The method as recited in claim 1, wherein the set of bookmarks is provided without receiving input via the search text box of the user interface.

13. The method as recited in claim 1, further comprising:

determining a frequency with which each bookmark in the set of bookmarks is selected via the web browser of the client; and displaying the set of bookmarks based, at least in part, on the frequency with which each bookmark in the set of bookmarks is selected via the web browser of the client such that a first subset of the set of bookmarks that is selected more frequently via the web browser of the client is displayed more prominently than a second subset of the set of bookmarks that is selected less frequently via the web browser of the client.

14. The method as recited in claim 13, wherein the first subset of the set of bookmarks and the second subset of the set of bookmarks are displayed using different display characteristics including one or more of font size, color, bolding, or underlining.

15. The method as recited in claim 1, wherein each of the set of bookmarks has associated therewith a set of one or more documents that have previously been selected via the web browser in association with the search query identified by the corresponding one of the set of bookmarks.

16. The method as recited in claim 15, further comprising:

receiving a selection of one of the set of bookmarks;

identifying the set of one or more documents that have previously been selected via the web browser in association with the search query corresponding to the selected bookmark; and providing a link to each of the set of one or more documents.

17. The method as recited in claim 16, wherein the selection of one of the set of bookmarks is received when a cursor is positioned over the one of the set of bookmarks.

18. The method as recited in claim 15, further comprising:

receiving a selection of one of the set of bookmarks; and in response to the selection of the one of the set of bookmarks, providing information associated with each of the set of one or more documents corresponding to the selected bookmark, wherein the information indicates a frequency with which each of the set of one or more documents has been selected via the web browser.

19. The method as recited in claim 18, wherein the selection of one of the set of bookmarks is received when a cursor is positioned over the one of the set of bookmarks.

20. The method as recited in claim 1, further comprising:

receiving a selection of one of the set of bookmarks; and in response to receiving the selection of the one of the set of bookmarks, executing the search query identified by the corresponding bookmark and providing search results obtained as a result of executing the search query identified by the corresponding bookmark.

21. The method as recited in claim 1, wherein information pertaining to a bookmark is stored in user data of the web browser in response to a selection of one of the set of search results via the client.

22. The method as recited in claim 1, wherein automatically storing the information pertaining to a bookmark is performed in response to a selection via the web browser of one of the set of search results.

23. The method as recited in claim 1, wherein the set of bookmarks is retained over multiple search sessions.

24. The method as recited in claim 1, further comprising:

in response to user input, deleting the set of bookmarks.

25. The method as recited in claim 1, wherein upon receiving a selection of one of the set of bookmarks, providing a set of links to a set of documents that have previously been selected via the web browser in association with the search query identified by the corresponding bookmark and an indication of a frequency with which each of the set of one or more documents has been selected via the web browser.

26. The method as recited in claim 25, wherein the indication is provided via a set of display characteristics associated with the selected bookmark.

27. A non-transitory computer-readable medium storing thereon computer-readable instructions, comprising:

receiving a search query via a web browser of a client;

obtaining a set of search results corresponding to the search query;

providing the set of search results corresponding to the search query;

automatically storing information pertaining to a bookmark in user data of the web browser, wherein the bookmark identifies the search query that was received via the web browser of the client;

retrieving information pertaining to a set of bookmarks including the bookmark from the user data of the web browser; and providing, by the web browser, the set of bookmarks underneath a search text box of a user interface, wherein each of the set of bookmarks is user-selectable, wherein each of the set of bookmarks identifies a corresponding search query that was previously received via the web browser of the client;

wherein bookmarks provided by the web browser do not identify search queries received via other web browsers or client devices.

28. The non-transitory computer-readable medium as recited in claim 27, wherein each of the set of bookmarks has associated therewith a set of one or more documents that have selected via the web browser in association with the search query identified by the corresponding one of the set of bookmarks.

29. An apparatus, comprising:
   a processor; and
   a memory, at least one of the processor or the memory being adapted for:
   receiving a search query via a web browser of a client;
   obtaining a set of search results corresponding to the search query;
   providing the set of search results corresponding to the search query;
   automatically storing information pertaining to a bookmark in user data of the web browser, wherein the bookmark identifies the search query that was received via the web browser of the client;
   retrieving information pertaining to a set of bookmarks including the bookmark from the user data of the web browser; and
   providing, by the web browser, the set of bookmarks underneath a search text box of a user interface, wherein each of the set of bookmarks is user-selectable, wherein each of the set of bookmarks identifies a corresponding search query that was previously received via the web browser of the client;
   wherein bookmarks provided by the web browser do not identify search queries received via other web browsers or client devices.

\* \* \* \* \*